(12) United States Patent
Shipman, Jr. et al.

(10) Patent No.: US 11,591,159 B1
(45) Date of Patent: Feb. 28, 2023

(54) STORAGE AND CHARGING SYSTEM FOR DISPENSING TABLETS

(71) Applicant: Tech Friends, Inc., Jonesboro, AR (US)

(72) Inventors: Bobby L Shipman, Jr., Jonesboro, AR (US); Bryan D. Taylor, Bono, AR (US); Bobby L. Shipman, III, Jonesboro, AR (US); Joshua L. Parrish, Paragould, AR (US); Joseph Michael Schaefer, III, Jonesboro, AR (US); Mark Haney, Jonesboro, AR (US)

(73) Assignee: TECH FRIENDS, INC., Jonesboro, AR (US)

( * ) Notice: Subject to any disclaimer, the term of this patent is extended or adjusted under 35 U.S.C. 154(b) by 252 days.

(21) Appl. No.: 17/125,228

(22) Filed: Dec. 17, 2020

Related U.S. Application Data

(63) Continuation-in-part of application No. 16/897,105, filed on Jun. 9, 2020, which is a continuation-in-part of application No. 16/033,045, filed on Jul. 11, 2018, now Pat. No. 10,678,302, which is a continuation-in-part of application No. 15/136,604, filed on Apr. 22, 2016, now Pat. No. 10,225,734, which is a continuation-in-part of application No. 14/923,271, filed on Oct. 26, 2015, now Pat. No.
(Continued)

(51) Int. Cl.
*H02J 7/00* (2006.01)
*B65G 1/08* (2006.01)
*B65G 33/06* (2006.01)
*B65G 15/44* (2006.01)
*B65G 15/14* (2006.01)

(52) U.S. Cl.
CPC ............... *B65G 1/08* (2013.01); *B65G 15/14* (2013.01); *B65G 15/44* (2013.01); *B65G 33/06* (2013.01); *H02J 7/0045* (2013.01)

(58) Field of Classification Search
USPC ........................................................ 320/114
See application file for complete search history.

(56) References Cited

U.S. PATENT DOCUMENTS 4,061,956 A * 12/1977 Brown ................... H02J 7/0047
320/160
5,612,606 A * 3/1997 Guimarin ................ B60L 50/64
414/281

(Continued)

*Primary Examiner* — Samuel Berhanu
(74) *Attorney, Agent, or Firm* — Schrantz Law Firm, PLLC; Stephen D. Schrantz

(57) ABSTRACT

A charging and storage system provides a conveyor system within a housing that conveys electronic devices through the housing to charging devices located withing the housing. Charging contacts on an adjustment arm adjust between a charging position that charges the electronic devices and a transport position that allows movement of the electronic devices through the housing without contacting the charging contacts. A charging device located at each charging location charges the device while the device is stored within the housing. The conveyor system moves the electronic devices to these fixed charging locations to charge the devices while storing the devices. The conveyor system releases the electronic devices to an exit ramp that guides the electronic devices to a release aperture for removal from the housing.

20 Claims, 14 Drawing Sheets

Related U.S. Application Data

10,256,645, which is a continuation-in-part of application No. 14/869,592, filed on Sep. 29, 2015, now Pat. No. 9,917,455.

(56) References Cited

U.S. PATENT DOCUMENTS

| | | | | |
|---|---|---|---|---|
| 5,631,536 | A * | 5/1997 | Tseng | B60L 53/80 320/124 |
| 5,711,648 | A * | 1/1998 | Hammerslag | B60L 50/66 180/68.5 |
| 5,998,963 | A * | 12/1999 | Aarseth | B60L 53/80 320/109 |
| 2009/0058355 | A1 * | 3/2009 | Meyer | B60L 50/64 320/104 |
| 2010/0141206 | A1 * | 6/2010 | Agassi | H01M 50/204 320/109 |
| 2011/0156662 | A1 * | 6/2011 | Nakamura | B60L 53/80 320/162 |

\* cited by examiner

STORAGE AND CHARGING SYSTEM FOR DISPENSING TABLETS

CROSS-REFERENCE TO RELATED APPLICATIONS

This application claims priority to and is a continuation in part of U.S. patent application Ser. No. 16/897,105 entitled "SECURED CHARGING SYSTEM FOR ELECTRONIC DEVICES" that was filed on Jun. 9, 2020 that is a continuation in part of U.S. patent application Ser. No. 16/033,045 entitled "SECURED STORAGE FOR ELECTRONIC DEVICES" that was filed on Jul. 11, 2019 that issued as U.S. Pat. No. 10,678,302 on Jun. 9, 2020, that is a continuation in part of U.S. patent application Ser. No. 15/136,604 entitled "SECURED STORAGE FOR ELECTRONIC DEVICES" that was filed on Apr. 22, 2016 that issued as U.S. Pat. No. 10,225,734 on Mar. 5, 2019, which is a continuation in part of U.S. patent application Ser. No. 14/923,271 entitled "Protective Housing" that was filed on Oct. 26, 2015 that issued as U.S. Pat. No. 10,256,645 on Apr. 9, 2019 which is a continuation in part of U.S. patent application Ser. No. 14/869,592 entitled "Charging Unit and System" that was filed on Sep. 29, 2015 that issued as U.S. Pat. No. 9,917,455 on Mar. 13, 2018.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

In large organizations such as businesses, schools, hospitals, nursing homes, and jails, it is becoming increasingly common to have a significant number of mobile electronic devices to be charged on a regular basis. Current art for charging systems provides for basic charging but not comprehensive administration and control of mobile electronic charging throughout the organization. The present invention provides for large scale control of mobile device charging not possible with current art.

The present invention relates to a security system for charging and tracking tablets, smart phones, mobile computing devices, mobile electronic devices, and other electronic devices. The present invention provides an internal conveyor system within a housing to transfer the devices through the housing. Moving the devices within the housing limits access to the devices. The conveying system stores the devices away from an insertion aperture and release aperture. Moving the devices throughout the housing restricts access to the devices for storage within the housing.

The housing provides charging locations at which the device is stored within the housing. A charging device located at each charging location charges the device stored at the location. The conveyor system moves the devices to the charging locations at which the device is stored.

The storage and charging system allows remote control and management of the charging activity and mobile electronic device. The secure charging system may also be implemented with an identification system for the electronic device. In another embodiment, the secure charging system may securely store the electronic device to prevent unauthorized access to the device.

The secure charging system provides a method of charging the electronic device and a method of communication for remote administration. In one embodiment, the secure charging system may be implemented with communication capabilities to a central server and respond to commands from the central server. In another embodiment, the secure charging station may be implemented with peer-to-peer communications between charging stations.

If the user is granted access to a device, the conveying system releases the device to the release aperture. The user may then remove the device from the housing through the release aperture. To secure the device upon insertion, the conveyor system moves the device away from the insertion aperture.

In some embodiments, the secure charging system may accept commands and utilize a central server to coordinate charging activities across multiple chargers which are physically separated from one another. In one embodiment, the secure charging system could disable charging for one or more electronic devices based on a remote command. In another embodiment, the secure charging system could report all electronic devices currently being charged.

In one embodiment, the secure charging system may be implemented with an identification system to identify electronic devices attempting to charge. In this embodiment, charging could be enabled or disabled based on the identity of the electronic device and the rules established by administrative personnel. In some embodiments, the secure charging system reports electronic device identity and charging status to a central server. In some embodiments, the charging system may bill or track electricity usage based upon information collected and/or reported by the secure charging system. In other embodiments, the secure charging system may send alerts if an electronic device has not been returned to a charger within a specified amount of time.

The server of one embodiment tracks usage of the devices. The server tracks the devices that are checked out and the devices that have been returned. The server generates reports identifying the status of the devices. Such statuses include but are not limited to devices within the housing, devices out of the housing, devices in the housing not charging, devices charging in the housing, and updates to the device. The server generates reports identifying the status of the devices and the date and the time of the status of the device.

In some embodiments, the secure charger may be equipped with cameras to identify persons retrieving mobile electronic devices from the secure charger. In some embodiments, cameras may take pictures of returned mobile electronic devices for damage assessment and transmit the pictures to a central server for evaluation.

In some embodiments, a touchscreen for entry is attached to the secure charger for entry of user authentication information. In other embodiments, the charger integrates a biometric device such as a camera, microphone, fingerprint reader, or the like, for authentication.

The present invention also cleans, sanitizes, and/or disinfects the mobile computing device, such as the tablets, when the mobile computing device is placed within the secure charger. The housing applies a sanitizing spray, such as a disinfectant to the device(s). In another embodiment, a sanitizing light, such as a UV light, shines on the devices to disinfect each device.

II. Description of the Known Art

Certain problems exist with the known art. Known charging systems do not store devices within a housing that conveys the devices to a secondary location for charging and securely storing the devices. Known charging systems provide unfettered and unmonitored access to charging services after an electronic device is physically connected to the charger. Known charging systems do not allow remote management of chargers by administrative personnel. Known charging systems do not allow multiple chargers which are physically separated to act in unison as a single charging system.

Known charging systems for electronic devices do not allow security rules to be enacted to prevent unauthorized charging of devices. Known charging systems do not allow a central server to maintain charging rules which can automatically enable or disable charging to specific electronic devices or specific physical charging connections. Known charging systems cannot aggregate data into an analytical engine to determine costs or usage across multiple distributed chargers.

Known charging systems for electronic devices do not monitor when devices are charging or stop charging. Known charging systems do not report to a central server for tracking usage or billing activities. Known charging systems for electronic devices do not monitor the physical condition of the electronic device or assess it for damage while using the charging system.

Known charging systems for electronic devices do not disable the electronic device if the electronic device is not returned to a specified charger within a defined period of time. Known charging systems do not send alerts to administrative personnel when an electronic device has not been returned to a charger within a defined period of time.

Known charging systems for electronic devices do not take pictures of mobile electronic devices inserted for charging.

The present invention is needed to provide a unique charging system that efficiently manages large numbers of electronic devices within an organization such as a business, a school, correctional facility, or jail. The present invention is needed to prevent unauthorized charging and provide auditable rules-based security for charging electronic devices. The present invention is needed to enforce electronic device usage limits based on physical return of electronic devices to a charging station according to established rules.

SUMMARY OF THE INVENTION

The present invention relates to secured charging for charging tablets, smart phones, mobile electronic devices, mobile computing devices, and other electronic devices. The mobile computing devices may include, but are not limited to, tablets, smart phones, iPads, iPods, iPhones, Android devices, televisions, DVD playback devices, Raspberry Pi, Arduino device, radios, MP3 players, wearable devices, fitness trackers, digital audio players, and digital media players. The secured charging system of the present invention limits access to the devices, such as the tablets.

A conveyor system within a housing maintains the devices within the housing. The housing provides charging locations at which each device, such as a tablet, is stored and charged within the housing. A charging device located at each charging location charges the device while the device is stored within the housing. The charging locations are located at fixed locations within the housing. The conveyor system moves the devices to these fixed charging locations to charge the devices while storing the devices. Another embodiment provides wireless charging that allows charging of the devices within the housing. Such wireless charging may be implemented in the storage locations on the conveyor system such that placement of the device on the conveyor system enables charging of the device.

The charging device may provide charging contacts that contact the electrical charging contacts of a mobile electronic device when the device is properly placed into the housing. Other embodiments may implement wireless charging as discussed below such as inductive charging.

In one embodiment, the charging system identifies the mobile electronic device by exchanging identification data with the device electronically and communicates with a central server. In one embodiment, the server creates a charge request to charge the device. The central server compares the charge request against a database of charging rules which apply to the specific mobile electronic device. If the rules are met, the central server communicates to the charger that charging is allowed for the device. Once the secure charger receives authorization from the central server, electricity flows through the charging conductors between the secure charger and the mobile electronic device for charging the battery of the mobile electronic device. The charger may also charge the device according to a charging profile associated with the device or a device having conditions similar to the device.

In another embodiment, the secure charger may also be implemented with a locking system for securing the mobile electronic device until authentication of the user and device are completed by an authentication system. Such an authentication system may be implemented locally or remotely, such as on a server. The authentication system verifies the identity of the user.

A rules logic system, such as a server, may apply the rules of the system. Such rules may be implemented by the facility. Once verified against a database of rules, the housing releases the mobile electronic device for removal of the device from the housing.

In one embodiment, an administrator inputs charging rules into a central server database using a web form. The administrator specifies a rule defining the devices allowed to charge, the times charging is allowed, and the users allowed to unlock the mobile electronic device from the secure charger. Upon request by the secure charger, the central server uses the predefined rules setup by the administrator to determine whether the mobile electronic device should be charged while connected to the secure charger. In this embodiment, the central server also authenticates end users requesting the release of a mobile electronic device locked in the secure charger and determines whether to unlock the mobile electronic device based on the rules established by the administrator.

Controlling the charging of the devices enables administrators to control usage of the devices that may not be connected to a network. Administrators may selectively charge devices to control usage of the devices. Without a charge, users cannot use or misuse the devices. Administrators simply stop charging selected devices to limit use of the device.

Passwords have traditionally controlled access to a WIFI system. However, the users can access, use, and misuse the device without WIFI access. The present invention limits usage of electricity to eventually limit the usage of unauthorized devices. If the unauthorized devices cannot be charged, usage of the unauthorized devices will eventually cease.

Most devices provide a port for accepting a charger. The charging port may accept USB, USB micro, USB mini, Lightning, or other electrical insertion connection. New connections with new ports will more than likely be developed in the future. In some embodiments, a charging adapter of the present invention inserts into the port of the device. The charging adapter can be modified to function with the new ports and electrical insertion connections. In other embodiments, charging could be provided by inductive charging pads, ultrasonic transmission, light transmittal, or other energy transmittal mechanisms that charge mobile electronic devices.

In some embodiments, the charging system also provides a protective housing for the device. The housing is keyed to the charging station to orient the device when inserting the device into the charging station. The charging adapter is secured within the housing to enable charging of the device. Keyed locks or audible alarms could increase the security features of the present invention.

The housing of one embodiment protects the device from damage. The housing may also prevent access to certain features of the device. Eliminating access to these features prevents users from gaining unauthorized access to the device. The housing also prevents users from resetting the device to allow unfettered access to the user.

It is an object of the present invention to provide centrally controlled mobile electronic device locking.

It is an object of the present invention to track and record activity related to mobile electronic device insertion into and removal from a plurality of charging bases.

It is an object of the present invention to store devices within a housing.

It is an object of the present invention to limit access to devices stored within the housing.

It is an object of the present invention to charge the devices while the devices are within the housing.

It is an object of the present invention to convey the devices to charging locations within the housing to both charge the device and limit access to the device.

It is an object of the present invention to provide centrally controlled mobile electronic device charging.

It is an object of the present invention to enable charging to mobile electronic devices only when administrative rules have been met.

It is an object of the present invention to track and record activity related to mobile electronic device charging and present it in usable form for billing or other administrative purposes.

It is an object of the present invention to prevent charging of mobile electronic devices to unapproved devices connected to a secure charger.

It is an object of the present invention to securely charge an approved mobile electronic device within secure storage.

It is an object of the present invention to secure an electronic device not stored in a specialized case within the secure storage.

It is an object of the present invention to limit access to the electronic device by storing the device within the secure storage.

It is an object of the present invention to monitor usage of the electronic device by maintaining records of users who remove the device from the secure storage.

It is an object of the present invention to monitor charging of the electronic device by maintaining records of device presence on the secure charger and activation of charging to the device.

It is an object of the present invention to control access to the electronic device by restricting user's access to the device from the storage.

It is an object of the present invention to control access to the electronic device by allowing user's access to the device from the storage.

It is another object of the present invention to simplify the process of administrating the charging of multiple mobile electronic devices across an organization.

It is another object of the present invention to reduce the costs associated with charging multiple devices.

It is another object of the present invention to reduce unauthorized use and misuse of devices by restricting charging a mobile electronic device which has not been approved by the organization.

It is another object of the present invention to charge multiple mobile electronic devices within a single charging station.

It is another object of the present invention to limit access to selected users of the mobile electronic device.

It is another object of the present invention to limit access to selected features of the mobile electronic device.

It is another object of the present invention to clean, disinfect, and/or sanitize the mobile electronic device.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
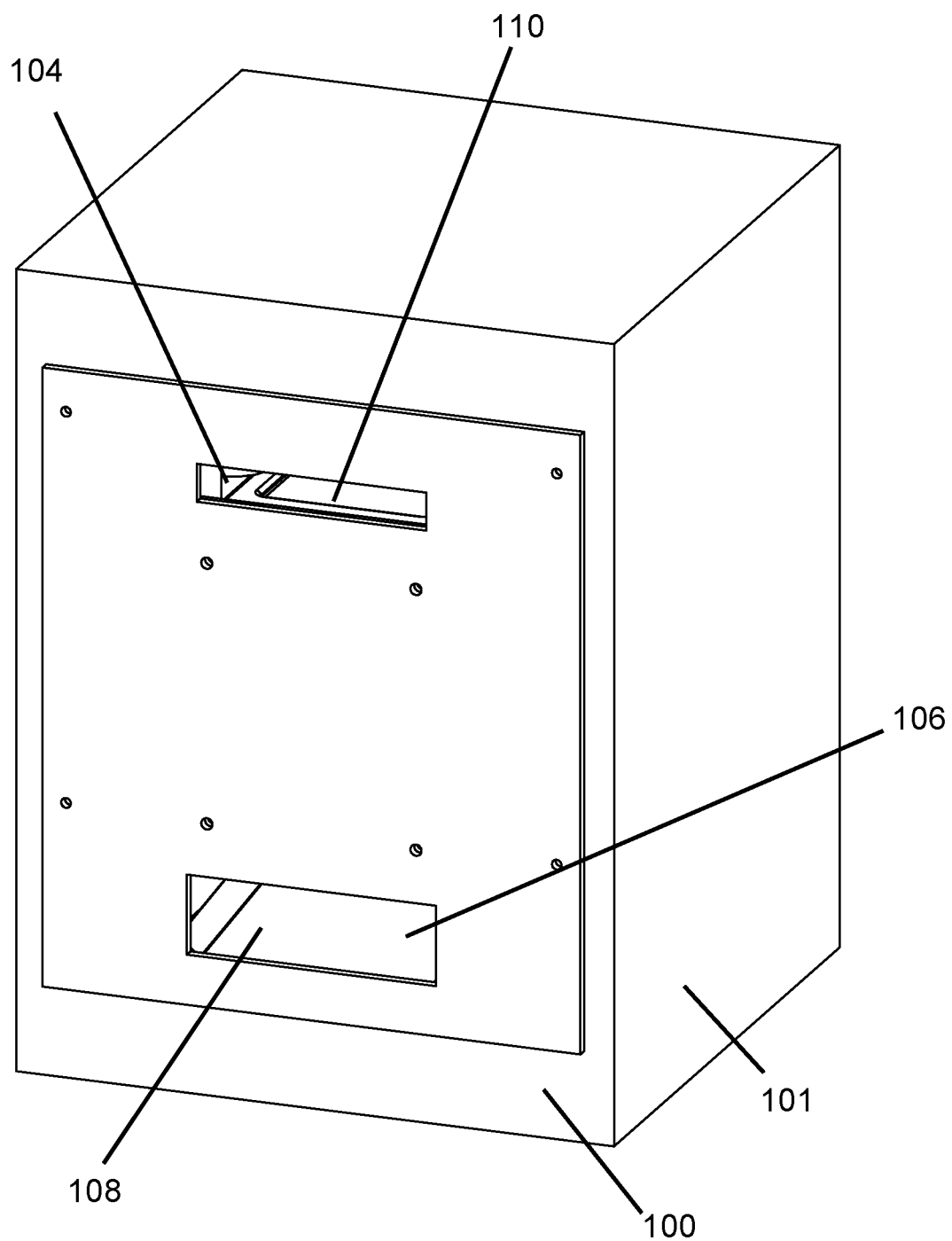
FIG. 1 is an environmental view of one embodiment of the present invention.
Figure 2:
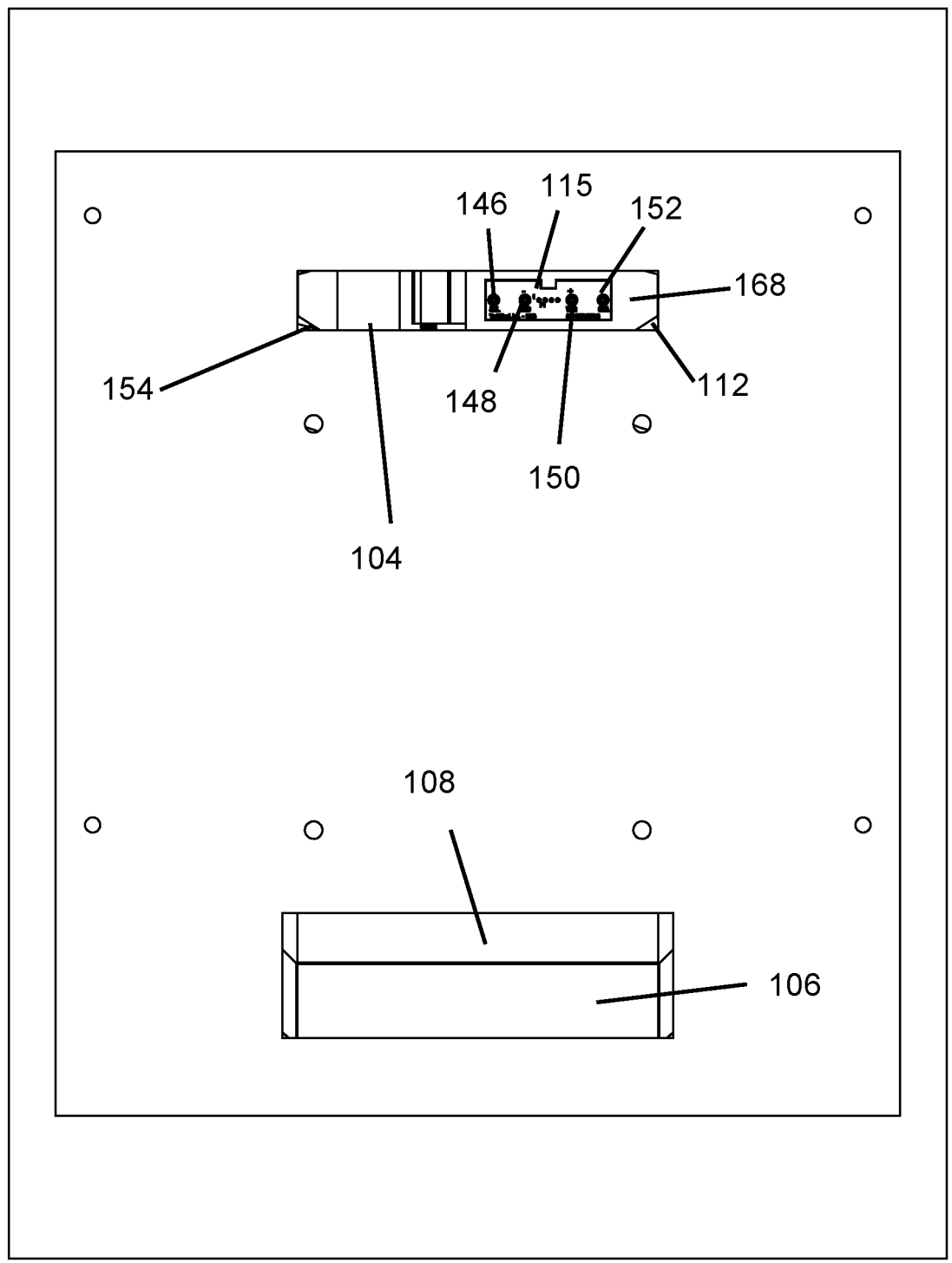
FIG. 2 is a partial front view thereof.
Figure 3:
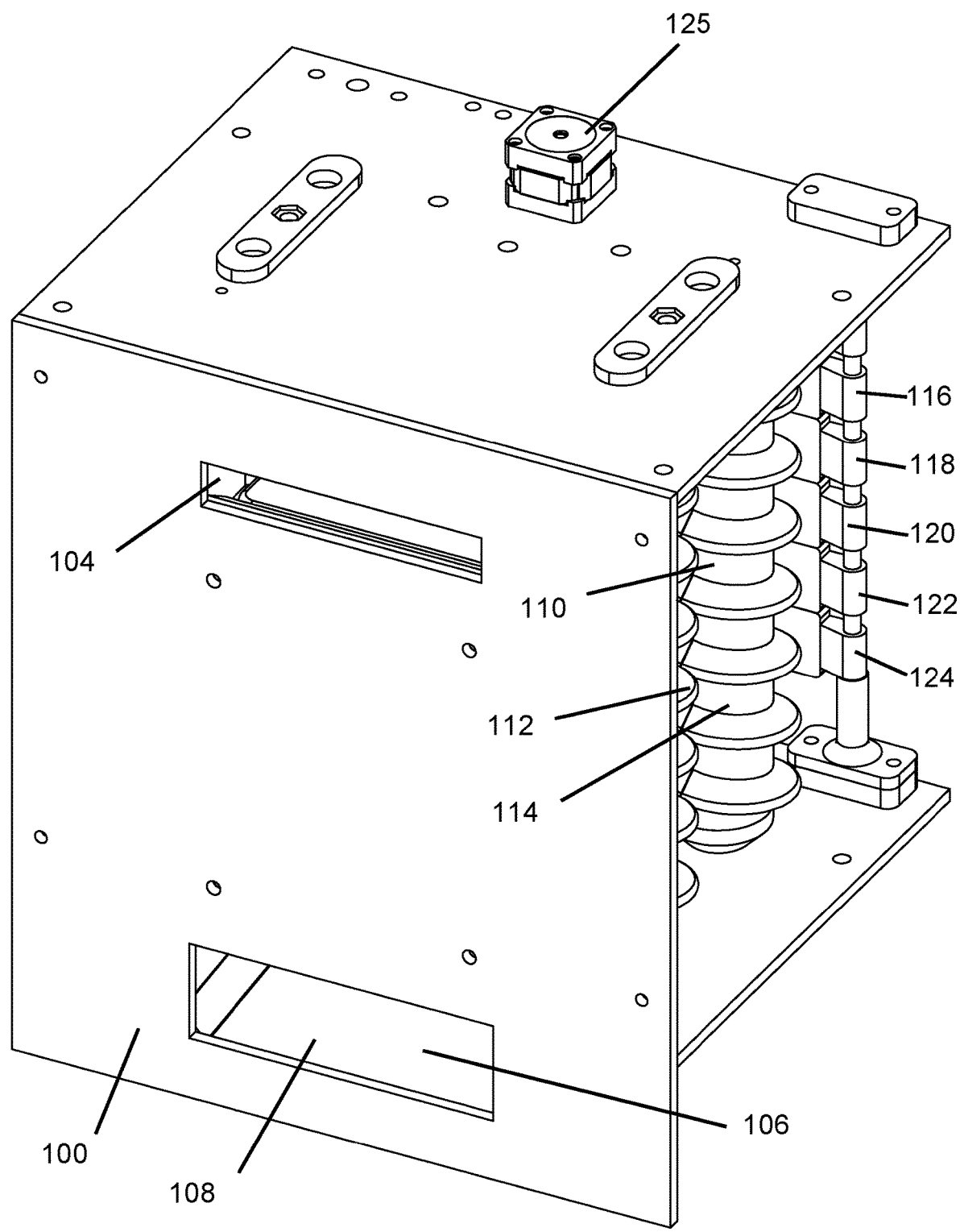
FIG. 3 is a partial perspective view thereof.
Figure 4:
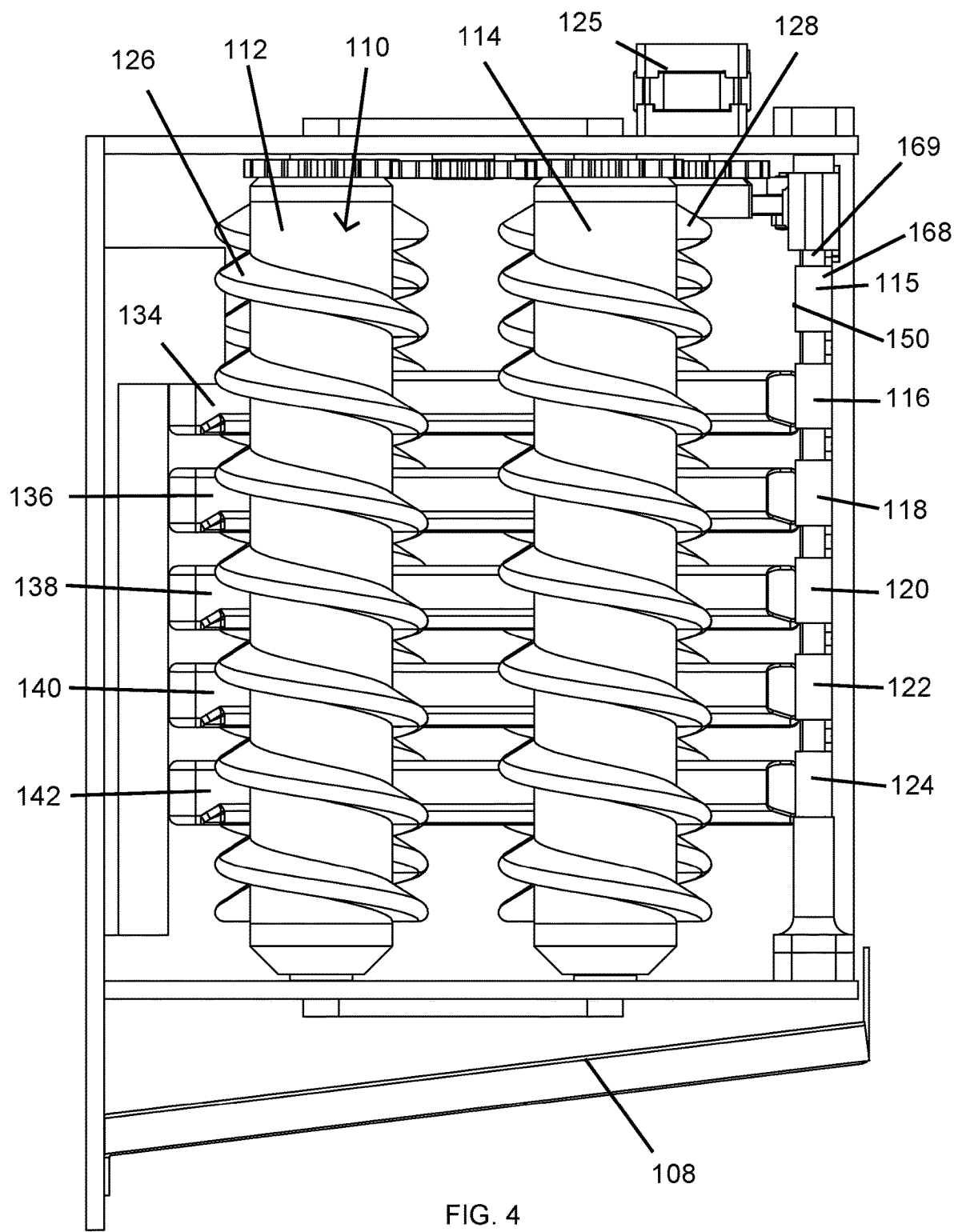
FIG. 4 is a sectional right side view thereof.

FIGS. 1-3 show an environmental view of one embodiment of the charging system 100 for storage and charging of a mobile computing device. The charging system 100 provides a housing 101 that at least partially encloses a mobile computing device 134, 136, 138, 140, 142 as shown in FIG. 4. The charging system 100 has been described as operating for a mobile computing device. The mobile computing devices may include, but are not limited to, tablets, smart phones, iPads, iPods, iPhones, Android devices, televisions, DVD playback devices, Raspberry Pi, Arduino device, radios, MP3 players, wearable devices, fitness trackers, digital audio players, and digital media players. The charging system 100 simplifies the process of charging the devices by removing the need to insert a plug into the port of the device to charge.

Most devices, such as tablets, provide a port for accepting a charger. The port may accept USB, USB micro, USB mini, Lightning, or any other electrical insertion connection. A charging adapter as taught by U.S. Pat. Nos. 9,917,455 and 10,225,734 inserts into the port of the device, which is hereby incorporated by reference. The housing secures the charging adapter within the port. The charging adapter provides two charging contacts that provide power to the battery of the device.

The charging system 100 provides a housing 101 to store the electronic devices and at least one, preferably multiple, charging locations within the housing 101. The user inserts an electronic device, such as a tablet, into the housing 101 at the insertion aperture 104.

Inserting the device into the insertion aperture 104 places the device on the conveyor system 110. The conveyor system 110 loads and unloads the devices into the housing. The conveyor system 110 positions the devices into the charging locations throughout the housing. The conveyor system 110 moves the devices through the charging locations to store multiple devices within the housing. Positioning the devices at the charging locations enables charging of the devices during storage within the housing.

Another embodiment provides wireless charging that allows charging of the devices within the housing. Such wireless charging may be implemented in the storage locations on the conveyor system such that placement of the device on the conveyor system enables charging of the device. Different wireless charging devices may be located throughout the housing or on the conveyor system at which the devices are stored.

The charging system 100 releases the devices, such as the tablets, from the housing 101. The conveyor system 110 transports the devices from the insertion aperture 104 to a release aperture 106. The device exits the housing 101 at the release aperture 106. The release aperture 106 may be a separate aperture than the insertion aperture 104. The insertion aperture 104 and release aperture 106 may be the same apertures. The housing may also provide multiple insertion apertures and release apertures that accept a device and/or release a device.

The conveyor system 110 of one embodiment moves the device downwards to the release aperture 106. The conveyor system 110 moves the device downwards until the conveyor system 110 ends. The conveyor system 110 releases the device to the release aperture 106. In one embodiment, the conveyor system 110 releases the device onto exit ramp 108.

The exit ramp 108 guides the device to the release aperture 106. The user can then retrieve the device from the release aperture 106.

FIG. 2 shows insertion aperture 104 that leads to the conveyor system. FIG. 2 shows screw conveyors 112, 154. Threads of screw conveyors 152, 154 key the insertion aperture 104 to limit insertion of the devices. Threads of screw conveyors 152, 154 partially obstruct insertion aperture 104. The threads direct insertion of the devices in the proper orientation with the charger of the device directed to the chargers within the housing, such as charging device 115, 116, 118, 120, 122 with charging pins 148, 150. Each of the charging devices 115, 116, 118, 120, 122, 124 attach to an adjustment arm 168 that pivots towards and away from the electronic devices on pivot 169 as discussed below in FIGS. 4-10. The threads limit insertion of the device to reduce insertion of devices into the housing in the wrong orientation.

FIGS. 2 and 3 show the conveyor system 110 powered by a conveyor driving device, such as a motor 125, actuator, or other powered device. The motor 125 drives the conveyor system 110. The motor 125 moves the devices through the housing 101. Different types of conveyor systems may be implemented within the housing 101. Such conveyor systems 110 may include, but are not limited to screw conveyors 112, 114, belt conveyors, robotic arms, roller conveyors, chain conveyors, slat conveyors, other conveyors or conveying systems.

FIGS. 2-10 show screw conveyors 112, 114, 154, 158 installed as the conveyor system 110. The screw conveyors 112, 114 are positioned to the right of the insertion aperture 104. The screw conveyors 154, 158 are positioned to the left of the insertion aperture 104. The screw conveyors are positioned with front conveyors and rear conveyors positioned on each side of the insertion aperture 104.

The four screw conveyors hold the device and transport the device within the housing. The motor is programmed to position the devices at different charging devices 115, 116, 118, 120, 122, 124. The conveyor system 110 moves the devices up and down within the housing 101. The conveyor system 110 stops the devices at the charging devices 115, 116, 118, 120, 122, 124 to charge the devices. A charging device located at the charging location charges each device located at the location. The devices ride the threads of the screw conveyors 112, 114, 154, 158.

Figure 5:
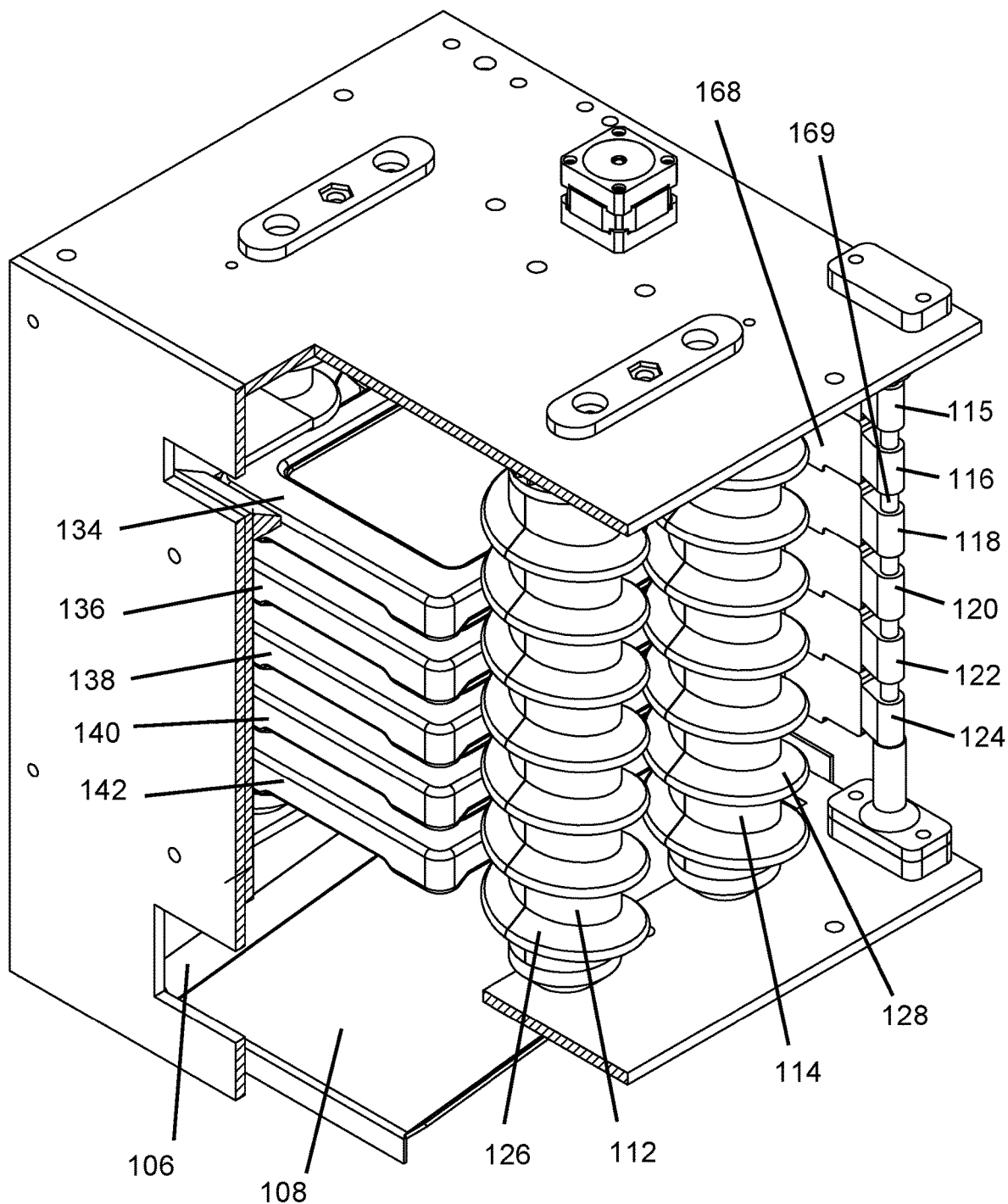
FIG. 5 is a partial perspective view thereof.
Figure 6:
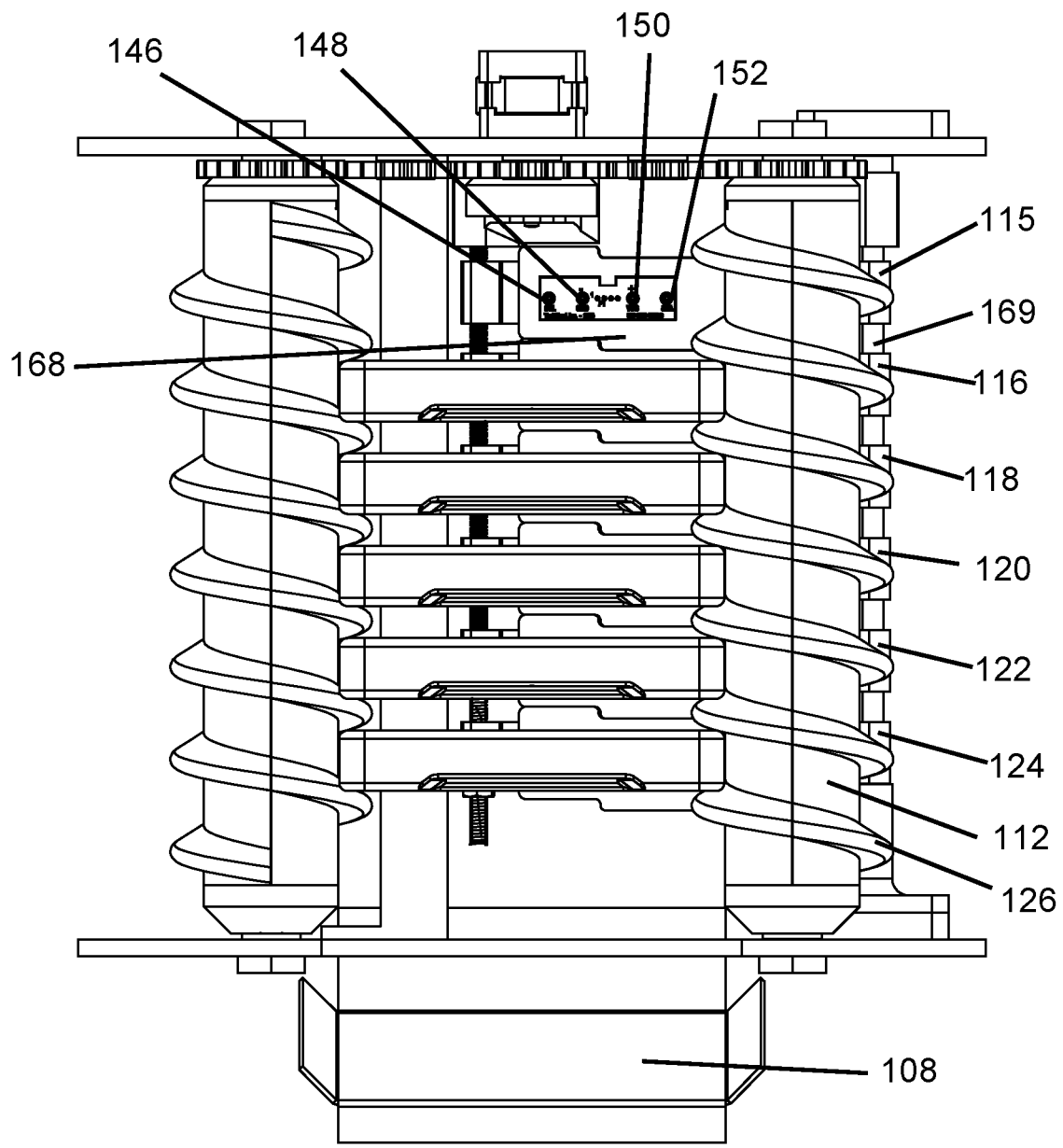
FIG. 6 is a partial front view thereof.

FIGS. 4-6 show the conveyor system with screw conveyors 112, 114 and threads 126, 128. The devices 134, 136, 138, 140, 142, such as tablets rest upon the threads 126, 128 of the screw conveyors 112, 114, 154, 158. Rotating the screw conveyors 112, 114, 154, 158 moves the devices 134, 136, 138, 140, 142 through the housing. The motor rotates the screws conveyors 112, 114, 154, 158 to sync the movement of the screw conveyors. Another embodiment implements multiple motors and/or actuators that are synchronized for conveying the devices through the housing.

The motor 125 rotates the screw conveyors 112, 114, 154, 158 to move the devices 134, 136, 138, 140, 142 vertically up and down as shown in FIG. 4. The screw conveyors 112, 114, 154, 158 position the devices 134, 136, 138, 140, 142 on the charging devices 115, 116, 118, 120, 122, 124. As discussed below, the charging devices 115, 116, 118, 120, 122, 124 charge the devices 134, 136, 138, 140, 142.

In one embodiment, the conveyor system 110 moves the devices vertically upwards and downwards through the housing 101. In another embodiment, the conveyor system 110 may move the devices side to side, and/or front to back or back to front.

FIGS. 4-6 show the ramp 108 that directs the released devices to the release aperture 106. The devices move vertically down according to rotation of the screw conveyors 112, 114, 154, 158. When the devices reach the end of the threads of the screw conveyors 112, 114, 154, 158, the screw conveyors 112, 114, 154, 158 release the devices to the ramp 108. The devices travel down the ramp 108 to the release aperture 106. The user can then retrieve the device from the release aperture 106.

FIGS. 6-10 show the charging of the devices. Charging devices 115, 116, 118, 120, 122, 124 provide charging contacts 148, 150 and data contacts 146, 152 that allow data transfer between the charging system, server, and the electronic devices. The charging devices 115, 116, 118, 120, 122, 124 accept the housing 104 in a set orientation, preferably a charging orientation. The charging contacts 148, 150 and data contacts 146, 152 correspond with contacts on the device. The conveyor system aligns the charging contacts 148, 150 of each charging device 115, 116, 118, 120, 122, 124 with the charging contacts 170, 172 of the device, such as the tablet, located at each charging device 115, 116, 118, 120, 122, 124. The threads 126, 156 of the front screw conveyors 112, 154 limit insertion of an electronic device to the charging orientation with the charging contacts and identification contacts of each device directed to the contacts of the charging devices.

The motor 125 transfers each device to a different charging device as the housing is loaded with electronic devices. The height of the housing may be increased to increase the number of charging devices and the number of tablets/electronic devices stored within the housing. The charging system stores an electronic device at each charging device to charge the device during storage.

The charging contacts of the charging devices connect to a power source. The conveyor system and housing accept the electronic devices in a charging orientation that directs the electronic devices 134, 136, 138, 140, 142 to the charging devices for charging.

The motor and conveyor system align charging contacts of the charging devices 115, 116, 118, 120, 122, 124 with charging contacts of the electronic devices 134, 136, 138, 140, 142. The charging contacts and identification contacts are located towards the rear of the housing, opposite of the insertion aperture.

The charging devices provide two charging contacts 148, 150 for contacting the charging contacts of an electronic device, such as a charging adapter electrically connected to the electronic devices. Electricity flows from the charging devices 115, 116, 118, 120, 122, 124 to the electronic devices 134, 136, 138, 140, 142 via the charging contacts. The conveyor system is keyed to accept the insertion of at least a portion of the electronic device where the charging device is located. The devices can then charge properly without insertion of a cord into the port. The contact between the charging contacts supply sufficient power to charge the device.

A power source supplies power to the charging contacts 148, 150 within the housing. The conveyor system is keyed to accept insertion of the electronic device in a set orientation, such as the charging orientation. The keying of the conveyor system prevents users from incorrectly inserting the device onto the conveyor system. The screw conveyors 112, 154 and threads 126, 156 create retention apertures that accept the electronic devices in the charging orientation.

The conveyor system accepts the electronic devices in a charging orientation. The electronic devices positioned in the charging orientation align the charging contacts. The screw conveyors 112, 154 and threads 126, 156 prevent insertion of the electronic device into the housing in an orientation in which the charging contacts cannot complete the circuit to transfer electricity to the device.

The charging system also provides a protective housing and charging adapter for the device as described in U.S. Pat. Nos. 9,917,455; 10,225,734; 10,256,645; and 10,678,302 which are hereby incorporated by reference. The housing of the electronic device is keyed to the conveyor system to orient the device when inserting the device onto the conveyor system. A blocking head of the electronic device is sized not to be inserted into the receiving apertures between the threads. In one embodiment, the blocking head may be sized larger than the receiving apertures.

As discussed above, the port of the device, such as devices 134, 136, 138, 140, 142 is usually located at the bottom of the device. The charging adapter and charging contacts of such a device would also be located at the bottom of the device 134, 136, 138, 140, 142. To complete the circuit, the charging contacts 148, 150 of the housing protrude forward towards the insertion aperture from the rear of the housing. The blocking head of the device would be located at the top of the device housing to prevent insertion of the top of the device housing past the screw conveyors 112, 154.

In one embodiment, an identification system of the housing communicates with the device to determine the device identifier of the device inserted into the housing. A port of the device provides different pins capable of different functions such as charging the battery and transferring data. At least one of these pins, a communication pin, provides a communication path between the device and the data contacts 146, 152. In one embodiment, the charging adapter serves as the communication system capable of identifying the device. The charging adapter of one embodiment provides contacts, such as a data contact, that communicates with the mobile device through the communication pin of the device. The data contact of the charging adapter contacts the communication pin of the mobile device. The communication system of one embodiment is implemented through the data contacts.

The data contacts of the device contact the data contacts 146, 152 within the housing to transfer an electric signal between the device and the charging device. The device data contacts of one embodiment connect to a port of the device. The data contacts contact a pin of the port to transfer data between the device and the charging device. In one embodiment, the data contacts of the electronic device are formed as part of the device. In another embodiment, the data contacts of the device are implemented on the charging adapter similar to the charging contacts described above.

A port of the device provides different pins capable of different functions such as charging the battery and transferring data. At least one of these pins, a communication pin, provides a communication path between the device and the housing. In one embodiment, the charging device serves as the communication system capable of identifying the device. The charging device of one embodiment provides contacts, such as data contacts that communicate with the mobile device through the communication pins of the device. The data contacts of the charging device contact the communication pin of the mobile device. The communication system of one embodiment is implemented through the data contact.

The charging devices of one embodiment communicates with the mobile devices through data contact of the charging device and the communication pin of the device. The charging device receives identification data from the device. The charging device determines the identification of the device. The server then instructs which devices to charge and which devices to release to specified users.

The server and storage system of one embodiment communicate with the electronic devices via data contacts 146, 152, such as identification contacts. The server receives identification data from the storage and charging system. The server determines the identification of the device via the data contacts 146, 152. The server may also acquire status updates and other data from the electronic devices via the data contacts 146, 152. The server then instructs which devices to charge and which devices to release to specified users.

The charging contacts and orientations have been shown in one manner as shown. The placement of the charging contacts may vary according to the placement of the charging contacts on the device, orientation of the insertion aperture, and the travel path of the electronic devices through the housing to the release aperture. The charging station may be configured to accept the electronic device in other orientations that will allow for charging of the device.

The charging station may also serve as storage of the devices. The devices may be placed into the charging station and then locked within the charging station. Locking the devices in the charging station prevents unauthorized access and securely stores the devices within the charging station.

The charging station may also be implemented as a mobile charging station. Wheels may be attached to the charging station to assist with transporting the devices and the charging station. The wheels increase the mobility of the charging station. A handle may also be attached to the charging station for maneuvering the charging station.

The charging and storage system communicates with a server, such as a computer, to identify whether a device should be released from the housing. The charging and storage system and server may communicate wirelessly or through a wired connection. Such communication may also occur across a network or across the Internet. A wireless communication device, including but not limited to NFC, WIFI, Bluetooth, and other wireless devices, may be provided with the housing to allow wireless communication with the server.

Access to the device secured within the housing may be granted upon certain conditions and/or rules as discussed in U.S. Pat. Nos. 9,917,455; 10,225,734; 10,256,645; and 10,678,302. The system tracks usage of the devices and the status of the user. Such status of the user may be based upon the user's behavior, the user's prior usage of the device, and the user's position in the hierarchy of accessing a device. The server identifies which users should be granted access to the device. The server assigns a device to a user. The server transmits a message to the housing identifying the device to be unlocked for the user. The server maintains a log of the devices that have been accessed by the users.

To release a device from the base, a user must enter a proper authorization code as shown in U.S. Pat. Nos. 9,917, 455; 10,225,734; 10,256,645; and 10,678,302. The secured storage grants access to the user who provides the proper credentials and identification. The system includes a server, such as a computer or other computing device, in communication with the charging and storage system. The system requests authorization from the user to access the device from secured storage. The user enters the user's identification and/or password to receive the device. The server authenticates the user's identification via such authentication methods which include, but are not limited to, password, PIN number, fingerprint, voice recognition, retinal scan, facial recognition, biometrics, or other authentication methods.

The server determines whether a proper identification has been entered. The server determines whether a proper user has attempted to access a secure device. If the credential check fails, the system denies the user access to a device. In one embodiment, the system may lock the user out by limiting the number of tries a user can attempt to access the device. The system may require the user to wait a specific amount of time before allowing the user to attempt unlocking the device.

If the user enters a proper identification, the server then determines whether the user should be allowed access to the device. The server checks the user and compares the user's identification against a set of rules or other criteria to determine if the system should allow the user access to a device. In one embodiment, the system compares the user's identification to an authorized list of users allowed access to the devices. The system defines rules determining whether to grant the user with access to a device. Such rules can include whether the device belongs to the user or whether the user should be granted access to a device.

The rules can include whether the device is sufficiently charged or in otherwise proper operating condition. The rules can define a minimum charge of the device. If the device is not charged to the minimum charge, the system denies access to the device. Such a charge may be based on the battery power of the device.

The rules may also be based upon rules or guidelines set forth by an institution, a school, a library, a prison, a jail, a detention center, a learning center, a business, a place of learning, or a place of confinement. The system may allow access to the device to users with good behavior, users who have time remaining to access a device, users who have not abused the devices, users who have not damaged devices, users who have not lost or stolen devices, users who have returned devices, or users who have not otherwise abused the system. The system may prevent access to the devices to those users who have poor behavior, users who have no remaining access time for a device, users who have abused the devices, users who have lost or stolen devices, users who have not returned devices, or users who have otherwise abused the system. The system may also deny access to the devices if insufficient devices remain and a user placed higher in the hierarchy is also attempting to access a device.

The system may deny access if a user has exceeded an available access limit. The system defines a set amount of time for which the user can access the device. The system tracks the amount of time a user has accessed the device from the housing. If the user exceeds the available access limit, the server denies access to the device. The server confirms that the user has available access time remaining before releasing the device to the user.

The system may also restrict access to certain time periods. If a user attempts to access a device outside of the available access time, the system denies access to the device. The system will allow access to the devices if the user accesses the device during the available access times.

One embodiment of the present invention provides devices with specific features or limited capabilities. These devices are assigned a specific class. The system grants access to users to devices of a specific class. These classed devices may be restricted for access by only a few users, granted greater access to allow an increased number of users to access devices of the class, or provided for free or low cost. Such classes may be a library class device or communication class device. The server communicates with the housing to identify which devices of a particular class that the user may access. The server identifies the user to determine the type of user. The type of user can access devices of a particular class or classes. The server identifies which classes the user may access and grants the appropriate access. The server instructs the housing to release a device to which the user has proper access.

The library class may be provided for an inmate law library. Such a library class may be restricted to only a set of users such that users outside of that set cannot access devices in the library class.

The communication class provides a number of devices that are restricted to a more restricted set of inmates. Users outside of the communication class cannot access the devices in the communication class.

During a rule check, the system determines whether the user is approved to access a device. If the rules indicate that a user should not be allowed access, the system denies the user access to a device. The system then requests authorization from a different user. As discussed above, the system may require the user to wait a specific amount of time before allowing the user to attempt unlocking the device.

The server of one embodiment implements the rules. If the server restricts a user from accessing a device, the server instructs the conveyor system not to release the device. The server sends the message to the conveyor system. The conveyor system then refuses access to the device by not delivering the device to the release aperture.

If the user is allowed access, the system sends a message to the conveyor system indicating that the user is granted access to a device. The message includes an authorization for the user to access a device. In one embodiment, the message identifies a device that is assigned to the user. The message may include the identification of the charging device and the location at which the assigned device is stored. The conveyor system may then release the assigned device through the release aperture.

The housing then sends the system a message indicating that the housing has received the message from the system. The message includes confirmation receipt of the message from the server. The message also includes confirmation that the conveyor system releases the assigned device.

The server receives the message from the charging system. The server confirms the authenticity of the message from the charging system. The server also confirms that the authentic message is the complete message from the housing. The server logs release information concerning the unlocked device. The information includes the user who accessed the device, the device ID assigned to the user, and the time that the device was released from the housing. Such information allows administrators, staff, or others to identify which devices have been released. The server logs the identification of device and the identification of the user who accessed the device from the housing. Such information enables the system to account for which users last accessed a particular device. The institution may then hold users accountable for devices accessed by the users.

The charging system releases a device for access by the user. The charging system receives an unlock message from the server. The charging system confirms the authenticity of the message from the server. The charging system also confirms that the message from the server is complete. If the charging system confirms that the message from the server is complete and authentic, the conveying system releases the device.

The charging system releases the device identified by the server. In another embodiment, the charging system may assign the device to be released and transmits the device identifier associated with the device so that the server can log the device identifier and the user who accessed the device.

The charging system of one embodiment restricts access of the device to authorized users and charges the device. The conveyor system provides charging apertures for receiving the mobile devices and positions the devices at the charging devices.

The charging system controls each charger individually to allow selective charging of individual devices. For example, the server may determine that some devices should charge, and other devices should not charge. The charging system activates the chargers associated with the devices to be charged. The housing does not activate the chargers associated with the devices not to be charged.

The devices communicate with the server and charging system for identification, updates, upgrades, and other modifications as discussed below. The charging system via the data contacts 146, 152 can update, upgrade, or otherwise modify devices inserted into the housing. The charging system can identify the device identifiers of the devices that are inserted within the housing and located at the data contacts 146, 152 of the charging devices. The housing can communicate with each other and the server to identify the location of the devices and the devices inserted into each housing. The server can then control charging of the different devices, cease charging through a designated base, etc. The housings may be placed in different areas of the facility. The server can then specify the different chargers to charge the devices based upon the location of the housing.

The housings identify the different devices inserted within each housing. The housings report the devices within each housing to the server. With such information, the server generates reports identifying the location of the devices, the user identifier of the user who accessed the device, the time of accessing the device, the time of returning the device, and the condition of the device.

Each housing identifies the mobile device inserted into the housing during insertion of the device. The housing identifies the electronic device via a unique device identifier associated with each device. Such device identifiers include but are not limited to a visual indicator, such as a barcode or other visually detected identifier, or an electronic identifier assigned to the device that is accessed from the device. An identification system detects the device identifiers to determine the identification of the device. The identification system may determine the device identifier via a visual identification device, an electronic identification device, a reader, a communication system between the housing and the device, or other detection system that can determine the device identifiers.

The electronic device exchanges identification data with the charging system. Such identification may be detected by the charging system with a visual identification device, including but not limited to a camera, a bar code reader reading a bar code or other identifier on the device, or other visual ID reader. Such visual identification device may be installed within the housing.

In one embodiment, the device exchanges the identification data with the charging system through a communication system. The identification data transfers through a communication system, such as a wireless connection, a wired connection, Bluetooth communication, ultrasonic, light, light pulses, or a contact such as the charging contact or data contact. Other data may also be exchanged through such a communication system. Such data may include software upgrades, configuration profiles, charging profiles, updates, upgrades, and other data.

Upon identifying the device, the housing communicates with a server. The housing submits the identification data of the device, such as the device identifier, to the server. The housing of one embodiment of the present invention also identifies the housing identifier associated with the housing and the charging device at which the device is currently charging.

The server may then maintain records of each device that is placed within the housing and the charging device at which the device is located. The charging system then controls charging of the device via the charging contacts 148, 150. Such a housing enables controlled charging of the device even if the device is not connected via the network.

Upon placement of the device at a charging device, the housing transmits a charge request to the server to determine if the charging device should charge the device. The charge request provides sufficient information to the server to identify the housing at which the device is installed, the identifier of the device, and the identifier of the charging device that will be charging the device.

In one embodiment, the housing updates the mobile computing devices that have been inserted into the housing. The device may not always be connected to a network to receive updates. Updating the computing device via the housing avoids issues related to being disconnected from the network. The housing receives the updates from the server. The communication system transfers data between the housing and the device. As discussed above, the communication system transfers data through a physical connection, a wired connection, or a wireless connection.

The data contacts update the device when the device is inserted into the housing and located at the charge position with the data contacts. The housing may receive software upgrades, configuration messages that update configuration profiles for the devices, messages that update the charging profile, and other upgrades, updates, and/or modifications for the devices. The communication system transfers the data from the housing to the device. The device may then communicate with the housing to indicate that the device has been properly updated and/or modified. The housing may then inform the server of the update and/or modification. One embodiment of the server updates the devices based upon the identity of the device and/or predefined rules.

In one embodiment, the housing and charging devices selectively charge devices. The server instructs the housing to charge specific devices. The housing determines the identification of each device inserted into the housing as discussed above.

The server determines the identification of the devices. The server receives identification information from the devices sufficient to determine the location of the device, the device identifier, the charging device at which the device is located, and the charging contacts that will charge the device.

After the server receives the identification information with the charge request, such as the housing identifier, the device identifier, the charger identifier, and the charging contacts that will charge the device, the central server compares the secure charge request against charging rules which apply to the specific mobile electronic device. The rules may vary according to the needs of the controlled environment or facility. In one embodiment, the rules are stored within a database. The rules may be stored locally or remotely within storage. If the rules are met, the central server instructs the secure charger to charge the device.

Once the secure charger receives authorization from the central server, the charger activates to charge the mobile device. Electricity flows through the charging conductors between the secure charger and the mobile electronic device for charging the mobile electronic device's battery.

Controlling the charging of the devices enables administrators to control usage of the devices that may not be connected to a network. Administrators may selectively charge devices to control usage of the devices. Without a charge, users cannot use or misuse the devices. Administrators simply stop charging selected devices to limit use of the device. If the unauthorized devices cannot be charged, usage of the unauthorized devices will eventually cease.

The server may impose rules before charging the device. Such charging rules as consider the status of the device, the status of the facility, the environmental status, the user's usage of the device, and other conditions.

The server and/or the charging system may determine that a device has been damaged or otherwise tampered with. If such a device has been damaged or tampered with, the server instructs the housing not to charge such a device. The housing may identify damaged devices based upon a visual inspection via the camera.

The housing may also identify damaged and/or tampered devices by identifying devices that no longer properly fit within the housing. Such proper fit may be determined by the ability to insert the electronic device onto the conveyor system. If the device does not properly insert into the conveyor system, the device has been tampered with or damaged. The housing will not charge such a device.

Other rules may be directed to the facility status. Such rules may require proper operation conditions to be in place to allow charging. The housing may prevent charging of the devices in riot situations, emergency situations, lock downs, or other unsafe conditions. During such situations, the server transmits a facility cease charging command that disables the housings' charging capabilities. The administrators may override the facility cease charging command. The housings may be installed in different areas such that the cease charging commands can disable only the housings within a designated area. The cease charging command may be sent to only those bases in the defined zone to be disabled.

Other charging rules implemented by the server include battery condition rules. Such battery condition rules include stop charging if the temperature within the housing is above a designated temperature, such as 113° F. Avoiding charging at such temperatures prolongs battery life of the device. The housing transmits the temperature at the housing to the server for the server to implement the charging rules.

The battery condition rules may also enable or disable charging based upon the charging profile of the battery. If the charger determines an improper charging profile of the battery, the housing may slow charging or disable charging of the device. In most instances, the housing will slow charging to prolong battery life.

The charger may also determine if a battery is not sufficiently charged. In some instances, a device may be returned to the charger with insufficient charge for operation of the device. The charger will then charge the device with enough electricity to identify the device. If an acceptable device identifier is not determined by the time a sufficient charge is acquired by the device or by a predetermined time, the charger will no longer charge the device. Such a charging system eliminates charging of unauthorized devices.

In some embodiments, an administrator inputs charging rules into a central server database using a web form, specifying a rule defining what devices are allowed to charge, the times charging is allowed, and which users the system allows release of devices from the housing. Upon request by the secure charger, the central server uses the predefined rules setup by the administrator to determine whether the mobile electronic device should be charged while connected to the secure charger. In this embodiment, the central server also authenticates end users requesting the release of a mobile electronic device locked in the secure charger and determines whether to release the mobile electronic device based on the rules established by the administrator.

The server determines that the rules are met to enable charging of the device. The housing charges the device until the device is ready for use. After the device is sufficiently charged, the device enters the rotation to be checked out to authorized users. An authorized user may then check out the device if the server and housing authorize the user's use of the device.

The present invention also provides a billing system for billing the usage of the devices. The billing system bills the user and the user accounts associated with the users. The user checks out the device from the housing. The server associates the user with the device to identify the user who has checked out the device for usage. The server logs the usage of the device by the user. Such logging may include a user identifier, a device identifier, and a time and date that the device was released to the user. The server may also log the condition of the device at the time that the device was released to the user. The server may also log the charge percentage of the battery of the device at the time the device is released to the user.

The user must then return the device to a housing. The system will also log the return of the device. The system will log the condition of the device, the charge percentage of the battery of the device, and the date and time that the device is returned.

The system then bills the user for the usage of the device. The system may bill based upon the time for which the device was released to the user. Such billing may be based upon the time that the user had the device. The system may also allow for a free period of time. The system grants access the user with access to the device for a limited time without charge. If the user exceeds the free time, the system allows continued access to the device with for a fee. The system bills the user/user account for the continued use of the device.

Such billing may be based upon the class of the device that the user accesses. Some classes of device may be provided at no charge or at a reduced rate. Other classes of devices may be provided to the user at an increased rate. For example, library class devices may be provided at no charge or billed at a lower rate. Devices in the entertainment class may be billed at a higher rate due to the increased features.

Another embodiment may bill the user based upon the power consumption of the device. The system determines the amount the battery has drained while the device is released to the user. The system may also bill upon the amount of electricity required for the device to be charged to the percentage at which the device was released to the user.

The system may also bill the user each time the user checks a device out from the housing. Upon removing the device from the base, the housing instructs the server that the device has been released a specific user. The billing system then bills the user/user's account for usage of the device due to the release of the device. In another embodiment, the user is billed upon the removal and return of the device to the housing.

The system also generates alerts based upon predefined rules. The rules of one embodiment generates alerts based upon predefined rules stored in the server. Such rules generate an alert based upon:
  a) Detection of the device not fully inserting into the housing and/or the conveyor system;
  b) Detection of a damaged device;
  c) Detection of a device that has been tampered with;
  d) Detection of a device with no power;
  e) Detection of a device that requires a software upgrade;
  f) Detection of a device requiring an updated configuration profile;
  g) Detection of a device with an inadequate charging profile;
  h) Detection of temperature exceeding a predetermined temperature;
  i) Detection of removal of a device without authorization;
  j) Detection that a device has not been removed from the housing within a predefined time period;
  k) Detection that a device has not been returned to a housing within a predefined time period; and
  l) Detection of an unauthorized device.

The system may generate an alert that is transmitted to the server. The server may then alert personnel of the alert condition that triggered the alert. Such an alert may be a message sent to a cell phone, a computer, a pager, or an audible alarm.

Another embodiment of the present invention provides an audible alarm. The alarm may be installed within a housing or within the facility. The alarm of one embodiment activates if a device is removed without authorization. The alarm alerts the personnel that a device is removed without authorization. In another embodiment, the alarm may activate upon detection of the alert conditions identified above. The system indicates which condition triggered the audible alarm.

One issue in correctional facilities is that inmates tend to be possessive of a particular device. The inmate may intimidate, harass, threaten, or otherwise harm another person for using such a device. For this reason, a device may remain within a housing. The server identifies mobile devices that have not been removed from the housing for a predetermined amount of time. Such identification alerts the administration that a particular device has been claimed by an inmate such that no one will use the device. The facility may then remedy the situation by pulling the device from rotation or moving the device to an area not accessible the inmate claiming ownership.

The server also identifies the mobile electronic devices that have not been returned to the housing within a predefined time period. The server alerts the administration that a mobile device has not been returned to the housing within the time period. Because the server can communicate with multiple housings, the server can check the status of the devices within all of the housings of the facility. The server of one embodiment generates an alert or an alarm to indicate that the device has not been returned.

In one embodiment, the system deactivates a device that has not been returned to the housing within the predefined time period. The server instructs the device to deactivate. The server of one embodiment denies the device access to the network. In another embodiment, the server sends the instruction to deactivate directly to the device. The device then deactivates until the administrator reactivates the device.

In one embodiment of the present invention, the server can identify the number of devices within the housing(s) of the facility. The server can take an inventory to determine if any devices are not installed within the housing(s). The server can then instruct the housing(s) to lock all devices within the housing(s) until all of the devices are accounted for by being returned to the housing(s). In one embodiment, the server requires a predefined number of devices to be inserted into the housings before unlocking any of the devices from the housings. The server instructs the housings to prevent access to the devices. The housings then do not release any devices. The system will allow an administrative override to allow administrators access to devices within the housings.

The housing of one embodiment provides a data contacts of the charging devices. The data contacts communicate with data contacts of the electronic device. The housing data contact and the device data contact transfer information between the device and the housing. Such data transfer between the housing and the device provides additional control of the devices.

The charging devices of one embodiment identify the device identifier associated with each device via the data contacts. Administrators can also update the devices as needed. The housing transfers the data needed to update the device to the device via the device contacts.

As discussed above, the housing and charging system communicate with and charge the electronic devices via the data contacts 146, 152 and the charging contacts 148, 150 of each charging device 115, 116, 118, 120, 122, 124 as shown in FIGS. 2, 4, and 7-10. The data contacts 148, 150 communicate with the electronic devices to update, upgrade, identify, and check the status of the devices. The system may apply rules to the devices based upon identification and status of the devices. The system may charge each individual device according to a charging profile via the charging contacts 148, 150 as discussed above.

Figure 7:
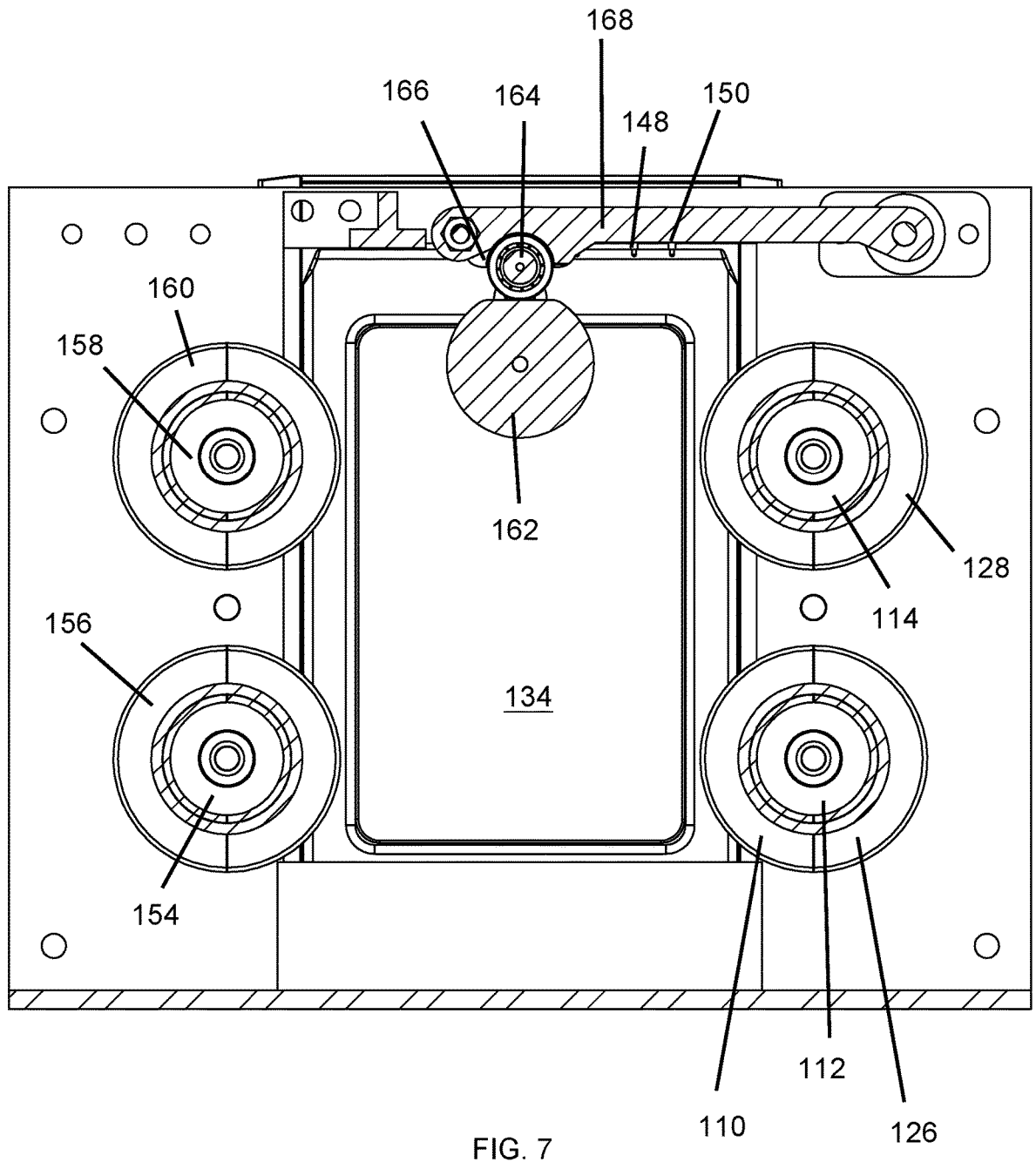
FIG. 7 is a partial top view thereof.
Figure 8:
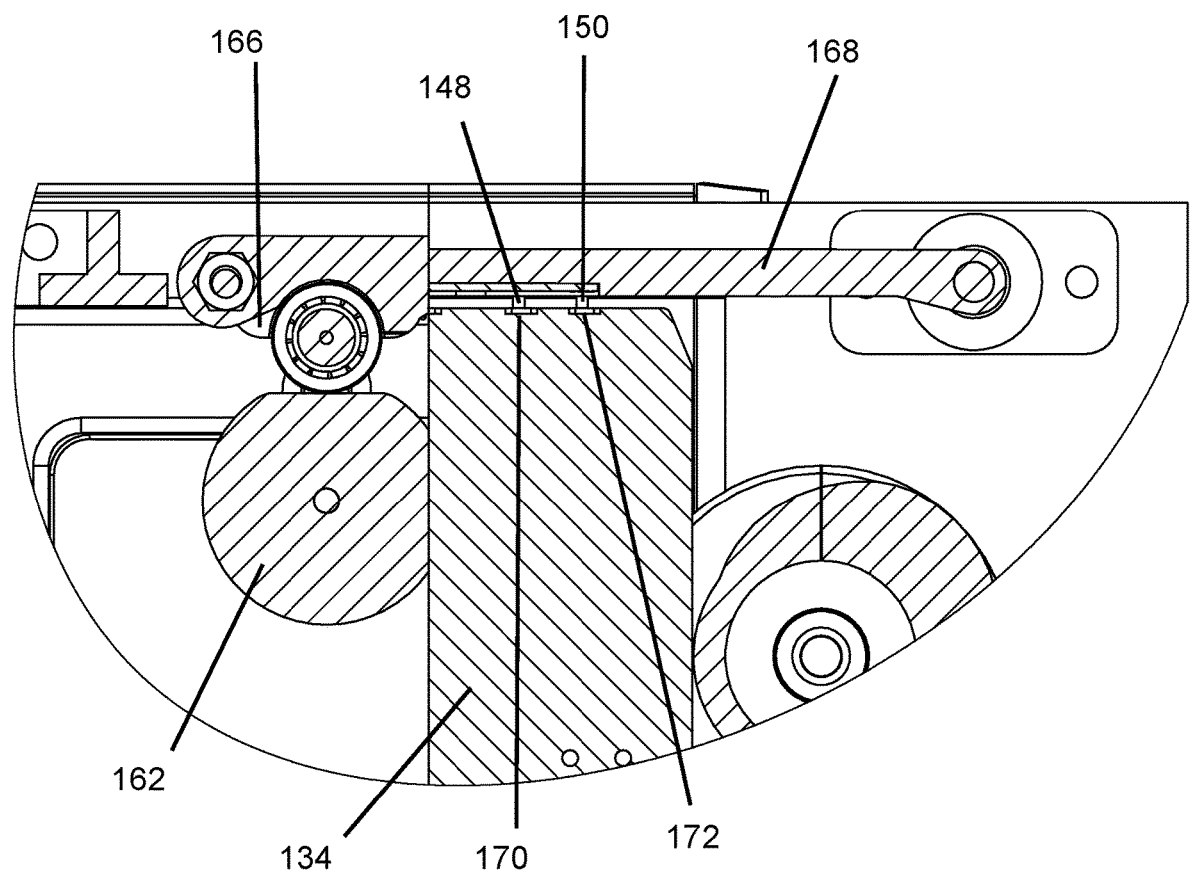
FIG. 8 is a partial top view thereof.
Figure 9:
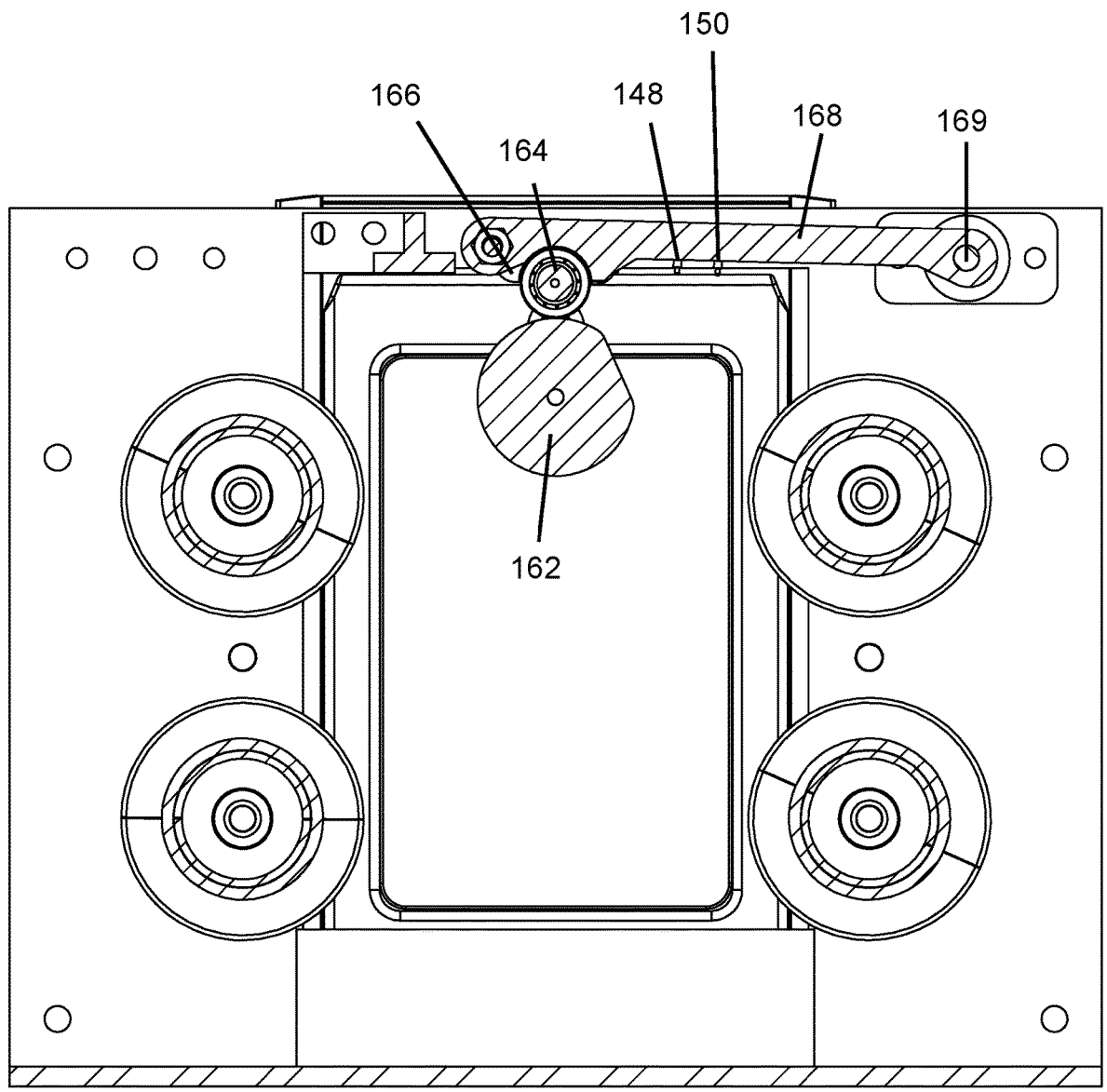
FIG. 9 is a partial top view thereof.
Figure 10:
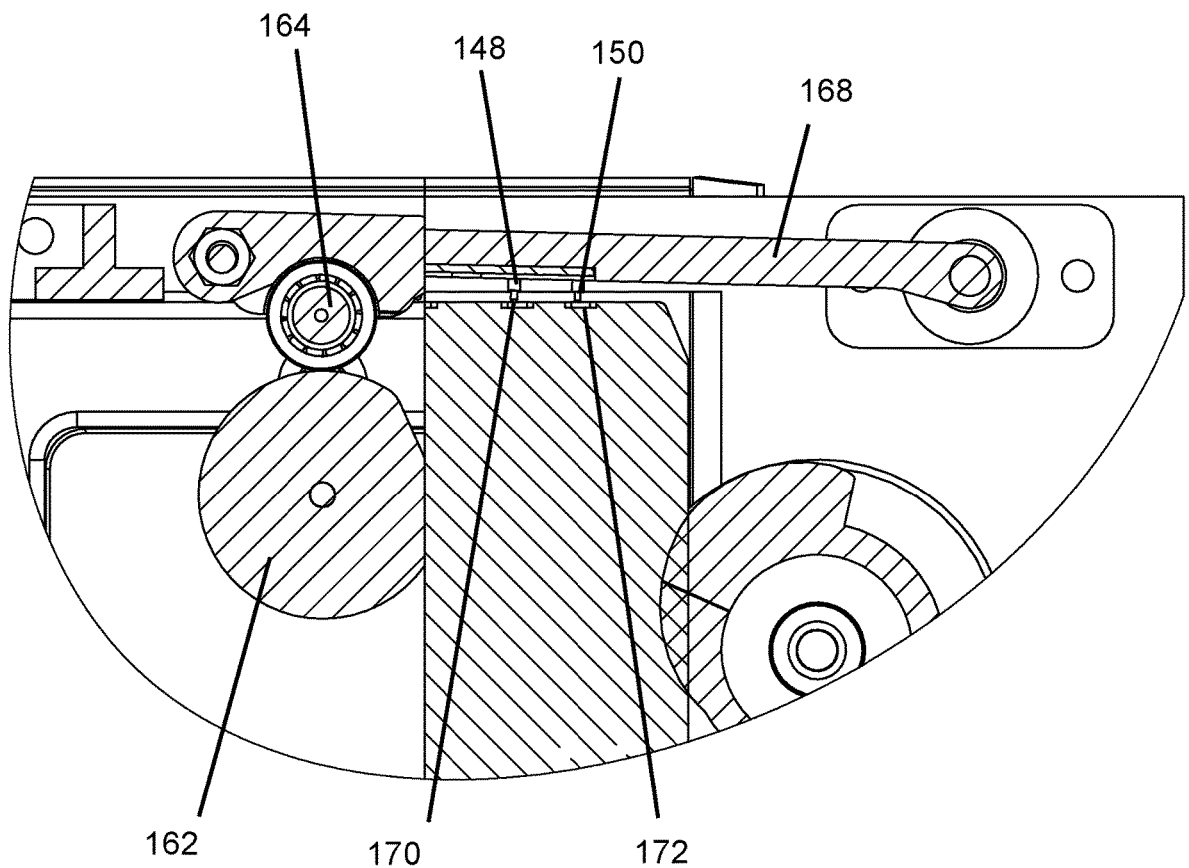
FIG. 10 is a partial top view thereof.
Figure 11:
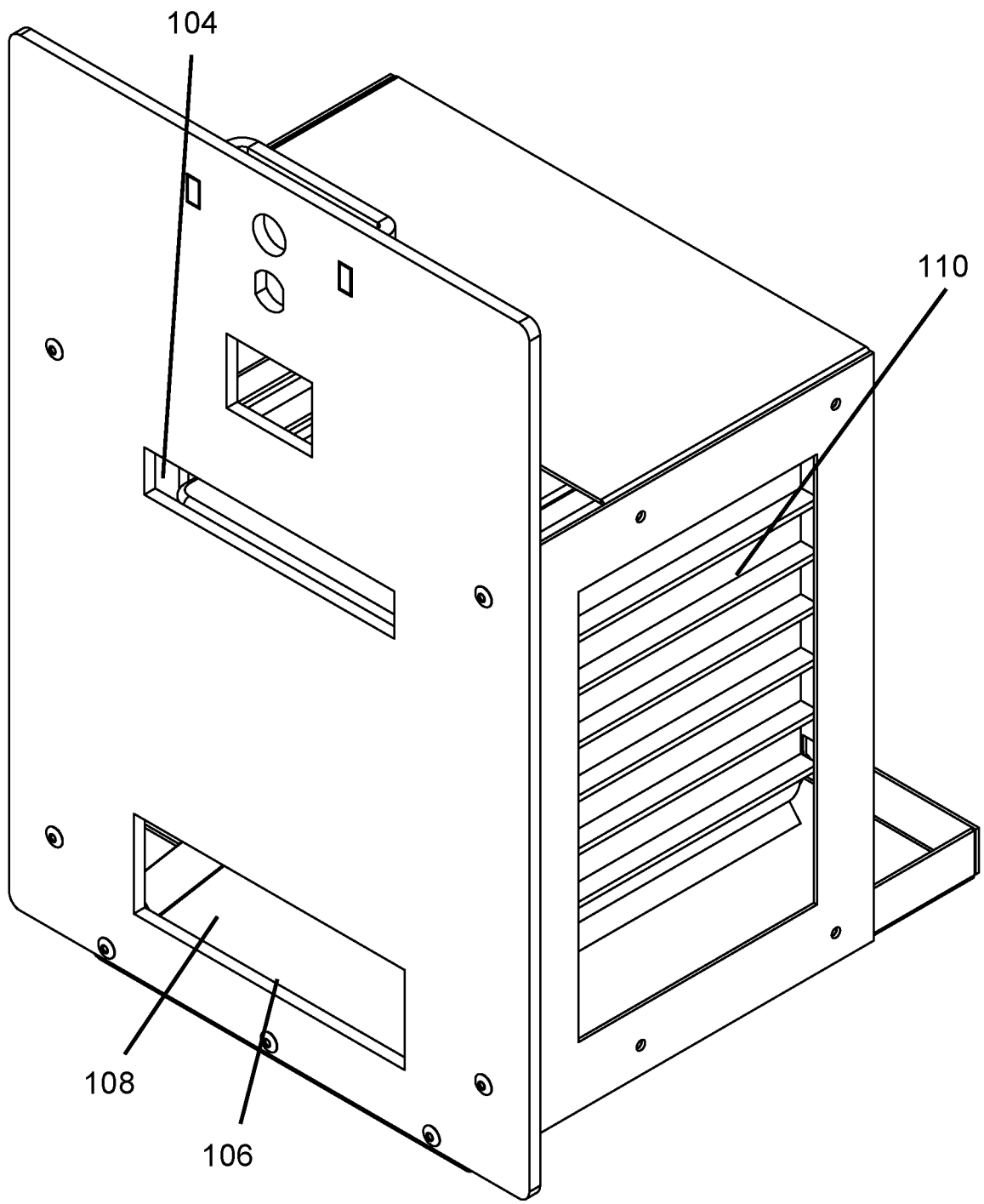
FIG. 11 is a partial perspective view of one embodiment of the present invention.

The charging contacts 148, 150 and the data contacts 146, 152 move toward the devices to contact the devices as shown in FIGS. 7 and 8 and move away from the devices for movement of the devices within the housing as shown in FIGS. 9 and 10. The charging contacts 148, 150 move towards the devices to contact the charging contacts 170, 172 of the electronic devices for charging. The data contacts 148, 150 move towards the devices to contact the devices to transfer data between the server and the devices. In one embodiment, the charging contacts and the data contacts are biased outward for contacting the electronic devices. The charging contacts and the data contacts are spring loaded to provide for contact with the device. When the charging contacts and data contacts contact the device, the charging contacts and data contacts may withdraw into the adjustment arm due to the contact with the device.

The contacts 146, 148, 150, 152 also move away from the devices as shown in FIGS. 9 and 10. The conveyor system moves the devices within the housing. Movement of the devices within the housing could damage the contacts 146, 148, 150, 152 due to contact and friction between the devices and the contacts 146, 148, 150, 152. The housing withdraws the contacts towards the housing and/or away from the devices to limit contact and friction between the devices and the housing. Withdrawing the contacts 146, 148, 150, 152 extends the life of the charging devices and the electronic devices.

FIGS. 7-10 show movement of only the charging contacts 148, 150 to simplify the figures. The data contacts 146, 152 move similarly to the charging contacts 148, 150 as discussed. The charging contacts 148, 150 and the data contacts 146, 152 move towards the devices when the devices are in the store mode. The charging contacts 148, 150 and data contacts 146, 152 move away from the devices when the devices are in transport mode.

FIGS. 7-10 show an embodiment of the present invention that provides data contacts and charging contacts 148, 150 that extend toward the device for charging and data exchange and that withdraw from the device for conveying the devices through the housing. The conveyor 110 constructed from screw conveyors 112, 114, 154, 158 with threads 126, 128, 156, 160 align the device in the proper orientation with the data contacts and charging contacts 148, 150.

FIGS. 7 and 8 show the charging contacts 148, 150 and data contacts contacting the device 134. The charging contacts 148, 150 and data contacts extend from the charging device towards the electronic device to contact the electronic device to charge the electronic device and transfer data.

FIGS. 2 and 4-10 show the adjustability of the charging devices 115, 116, 118, 120, 122, 124. Each of the charging devices 115, 116, 118, 120, 122, 124 provide data contacts 146, 152 and charging contacts 148, 150 that move towards the electronic device for charging and transferring data. The data contacts 146, 152 and charging contacts 148, 150 of the charging devices 115, 116, 118, 120, 122, 124 move away from the electronic devices for conveying the electronic devices through the housing.

An actuator, such as a cam rotated by a motor, adjusts an attachment arm or adjustment arms to which the charging device 115, 116, 118, 120, 122, 124 is secured. The charging devices 115, 116, 118, 120, 122, 124 may secure to an adjustment arm or individual adjustment arms 168. The adjustment arms 168 secure to a pivot 169 that pivots the adjustment arms towards the electronic devices and away from the electronic devices. Each of the charging devices, the charging contacts, and the data contacts adjust towards and away from the electronic devices via the adjustment arm 168.

One embodiment of the present invention implements a cam that adjusts an adjustment arm 168 on which the charging contacts and data contacts are attached. The cam 162 is positioned against a bearing 164. The bearing 164 is seated within bearing aperture 166 of the adjustment arm 168. The cam 162 rotates to position the charging contacts and data contacts between the charging position and the transport position. The charging contacts and data contacts of one embodiment retract into the adjustment arm when contacting the device in the charging position.

The adjustment arm 168 adjusts between a charge position as shown in FIGS. 7 and 8 and a transport position shown in FIGS. 9 and 10. The adjustment arm 168 pivots at pivot point 169 towards and away from the electronic device depending upon the orientation of the cam 162. In one embodiment, the adjustment arm 168 is biased towards the device. The flattened edge of cam 162 brings the adjustment arm 168 and the charging contacts 148, 150 and the data contacts towards the electronic device to contact the electronic device.

The cam 162 rotates to a rounded edge that extends farther from the center of the cam than the flattened edge. The cam pushes the adjustment arm 168 away from the electronic device. The adjustment arm 168 moves away from the electronic device. The charging contacts 148, 150 and the data contacts no longer contact the electronic device when the adjustment arm is positioned in the transport position as shown in FIGS. 9 and 10.

Figure 12:
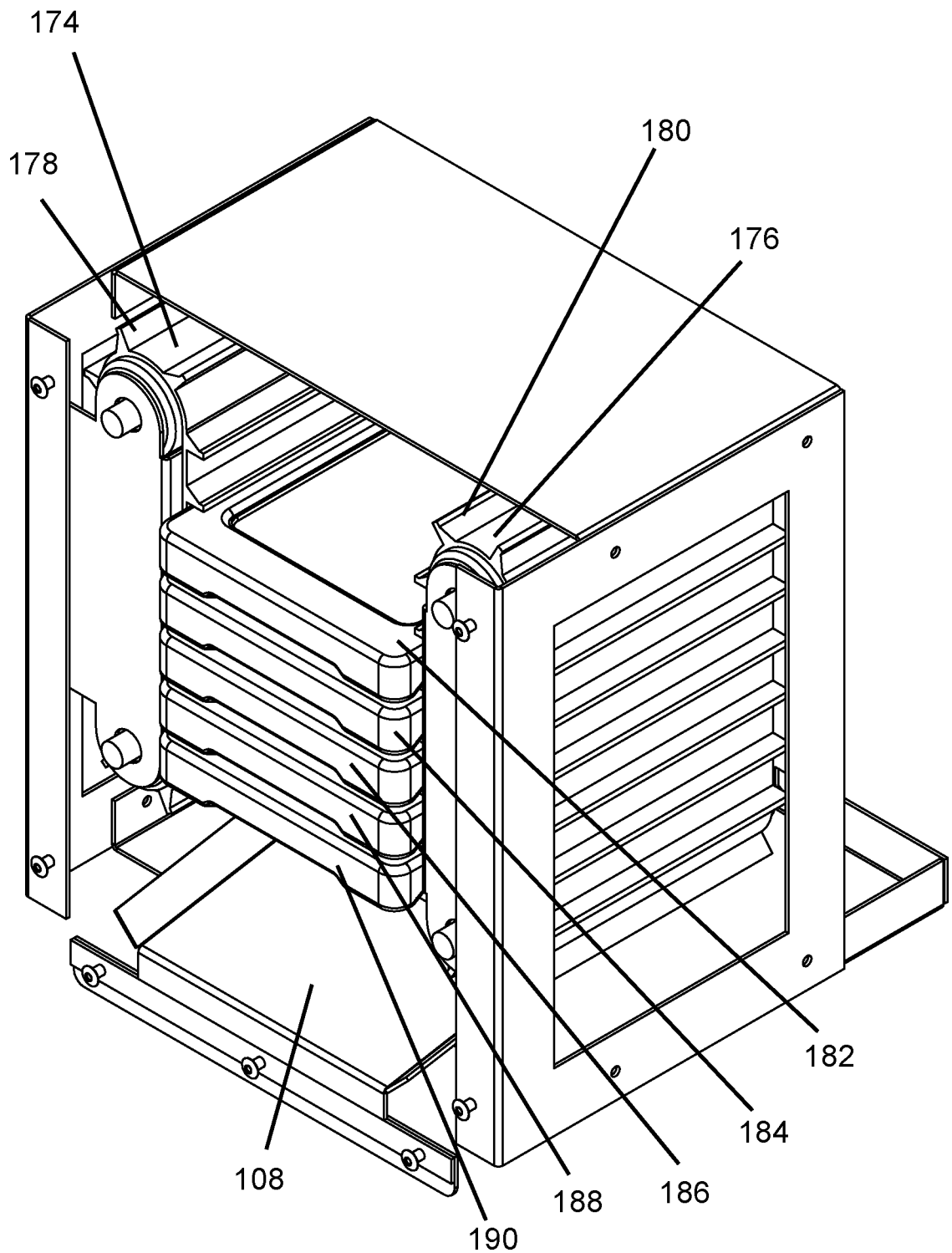
FIG. 12 is a partial perspective view thereof.
Figure 13:
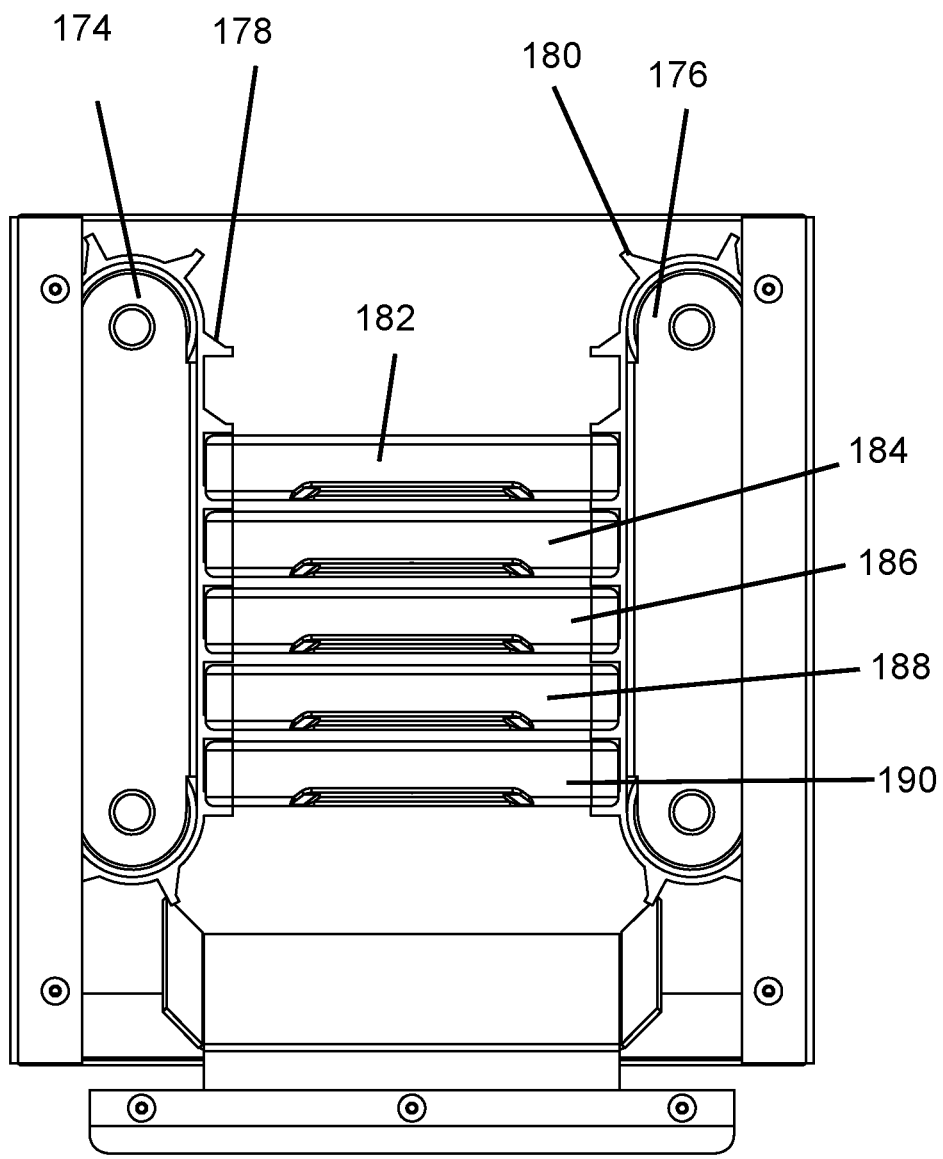
FIG. 13 is a partial front view thereof.
Figure 14:
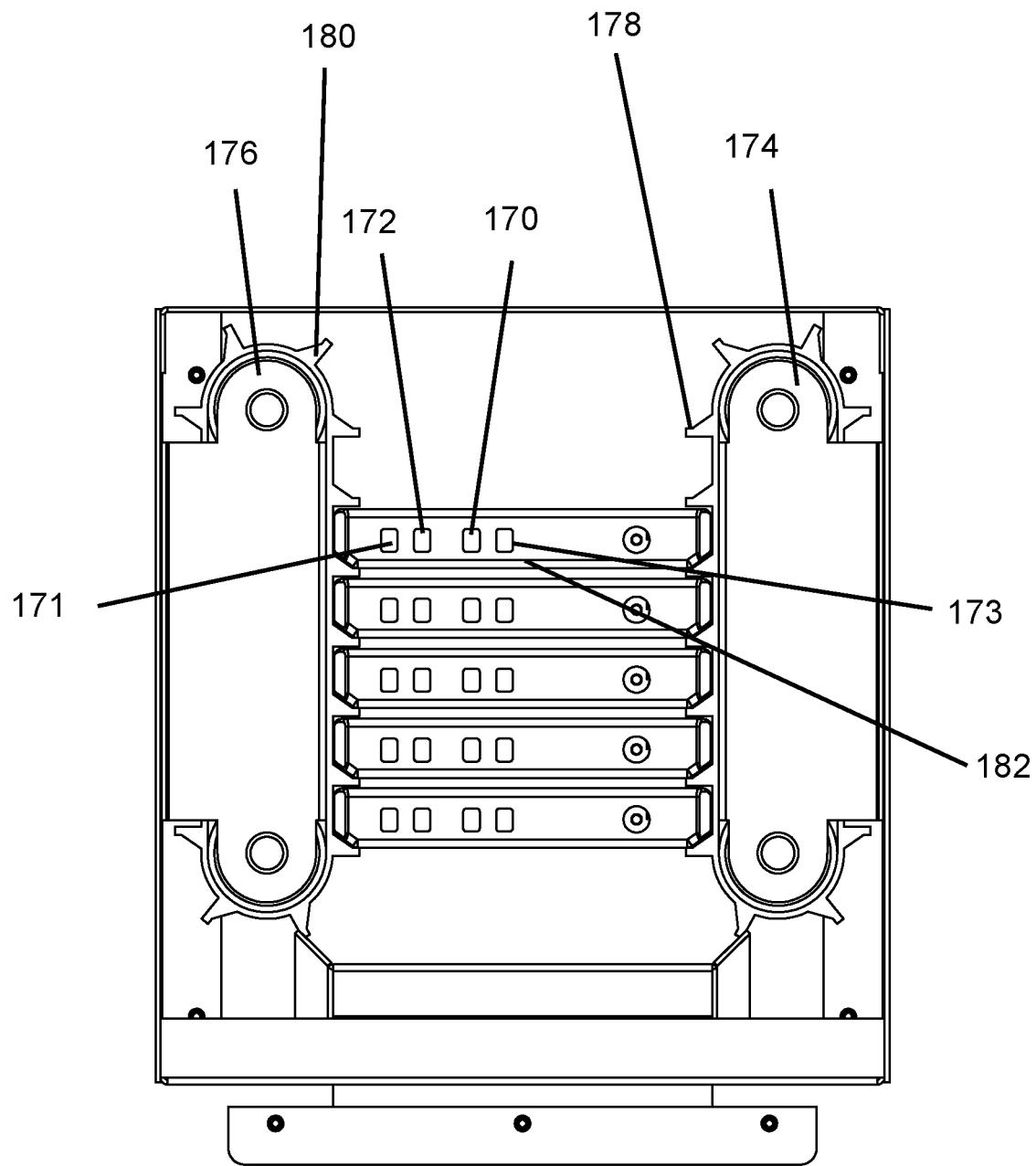
FIG. 14 is a partial rear view thereof.

FIGS. 12-14 shown another embodiment of the present invention implementing a belt conveyor instead of the screw conveyors. The embodiment shown in FIGS. 12-14 shows a housing (removed in FIGS. 12-14 to show the belt conveyor). The housing limits access to the conveyor system 110. The users insert the electronic device into the insertion aperture 104. The conveyor system 110 releases the electronic devices to the exit ramp 108 and the release aperture 106.

The belt conveyors 174, 176 provide transport fingers 178, 180 upon which devices 182, 184, 186, 188, 190 rest. The belt conveyors 174, 176 move the devices through the housing from charging device to charging device until the housing releases the electronic device via exit ramp 108 or through a release aperture. During storage, the devices 182, 184, 186, 188, 190 are stored on the transport fingers 178, 180 within the housing.

The insertion aperture may include a keyed entrance that requires insertion of the electronic devices in a set orientation. The keyed entrance requires a particular sized device that is inserted in a particular orientation. The electronic device is shaped to fit within the keyed entrance in a charging orientation. The keyed entrance restricts insertion of the electronic devices to an orientation for charging.

FIG. 14 shows the data contacts 171, 173 and the charging contacts 170, 172 directed to the rear of the housing. These data contacts 171, 173 and charging contacts 170, 172 of the electronic devices, such as devices 182, 184, 186, 188, 190, contact the charging contacts and data contacts within the housing, such as those shown in FIGS. 2 and 6-10.

The charging contacts, data contacts, and orientations have been shown in one manner as shown. The placement of the charging contacts and data contacts may vary according to the placement of the port and the size of the station. The charging station may be configured to accept the electronic device in other orientations that will allow for charging of the device.

The conveyor system stores the electronic devices within the housing. Additional equipment and apertures may be added to allow for releasing specific devices to a user. In one embodiment, the conveyor system stores the different devices. An actuator positioned at a release aperture may then direct a device towards the release aperture.

The conveyor system may also provide instructions for storing the devices on the conveyor system. The conveyor system may adjust to prevent empty slots on the conveyor.

Another embodiment of the present invention provides a sanitizing system installed within the housing. The sanitizing system sanitizes, cleans, and/or disinfects the electronic devices. In one embodiment, the sanitizing system cleans the electronic device prior to releasing the device to an authenticated user. The sanitizing system may be implemented on the rules based system described above that applies rules to determine if the device should be released to the authenticated user.

The sanitizing system provides a sanitizer such as a spray unit with nozzles, UV light, or other sanitizer. The spray unit disperses a sanitizing spray, such as a liquid or gel, on the electronic device. The nozzles spray the sanitizing spray on the electronic device.

The sanitizing spray is stored within a reservoir. A pump sprays the sanitizing spray through the nozzles of spray unit onto the electronic devices. Reservoir may supply the spray to each unit or a single unit. Pump is powered by a power source.

Another embodiment may include a brush that contacts the electronic devices to brush the electronic devices. Pump sprays the sanitizing spray through the brush. The brush of one embodiment may include a wick that supplies the sanitizing spray to the brush. In one embodiment, a brush is installed within each charging aperture between which the electronic devices are placed. The brush applies the sanitizing spray to the electronic device and brushes the spray across the device. Reservoir may supply the spray to each brush or a single brush. Pump is powered by a power source.

Another embodiment of the present invention may provide lights, such as UV lights that sanitize the electronic device. Each light is associated with a charging aperture. The lights are oriented to align with the charging aperture with insertion of the electronic device. The lights may be ultraviolet lights or other lights that disinfect the electronic device. Applying the light for a particular amount of time disinfects and/or sanitizes the electronic device.

The server may control the sanitizing system. The server may track sanitation of each device. In another embodiment, the housing controls the sanitizing system. The system of one embodiment maintains records indicating that devices have been sanitized and the time of sanitizing the devices. In one embodiment, the system activates an alert if the light or spray system is not functioning due to power failure, bad pump, no sanitizing spray, or non-functioning light. The server may maintain records of when the devices 134, 136, 138, 140, 142 were sanitized. The server may also activate an alert for when the sanitizing systems are not functioning properly.

The sanitizing systems may sanitize all charging apertures or may only sanitize those charging apertures occupied by a device. The sanitizing system tracks the device identifier and sanitization records to confirm the sanitation of the devices.

The rules logic system, such as the server, of one embodiment may require sanitation of the device before releasing the device. The system may lock the device until the device has been sanitized. The system may sanitize the device and release the device or release another device that has been sanitized to the user.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A charging system for storing and charging an electronic device, wherein the system releases the electronic device to an authenticated user, the system comprising:
 a housing that accepts insertion of the electronic device wherein the housing limits access to the electronic device;
 a charging device within the housing that charges the electronic device;

a conveyor system upon which the electronic device is placed, wherein the conveyor system conveys the electronic device within the housing;
a release aperture of the housing, wherein the conveyor system conveys the electronic device toward the release aperture.

2. The system of claim 1 wherein the charging device charges the electronic device while the electronic device is on the conveyor system.

3. The system of claim 2 wherein the conveyor system comprises:
a first screw conveyor located on a first side of the electronic device; and
a second screw conveyor located on a second side of the electronic device, wherein the first side is located opposite the second side.

4. The system of claim 3, wherein the conveyor system comprises:
a third screw conveyor located on the first side of the electronic device; and
a fourth screw conveyor located on the second side of the electronic device.

5. The system of claim 2, wherein the conveyor system comprises:
a first belt conveyor located on a first side of the electronic device;
a second belt conveyor located on a second side of the electronic device;
a transport finger on each belt conveyor wherein the electronic device is positioned on the transport fingers of the first belt conveyor and the second belt conveyor.

6. The system of claim 1 further comprising:
a charging contact of the charging device, wherein the charging contact contacts the electronic device to charge the electronic device;
wherein the conveyor system conveys the electronic device to the charging device.

7. The system of claim 6 further comprising:
an adjustment arm attached to the housing wherein the charging contact are located on the adjustment arm;
wherein the adjustment arm adjusts between a charge position to charge the electronic device and a transport position in which the charging contact does not contact the electronic device;
wherein the charging contact contacts the electronic device to charge the electronic device when the adjustment arm is adjusted to the charge position.

8. The system of claim 7, wherein the adjustment arm is pivotally attached to the housing to pivot towards the electronic device when adjusted to the charge position and the adjustment arm pivots away from the electronic device when adjusted to the transport position.

9. The system of claim 7 wherein the charging contact is spring loaded so that the charging contact at least partially withdraws into the adjustment arm when the adjustment arm is adjusted to the charge position.

10. The system of claim 8 further comprising:
a cam secured to the housing, wherein rotating the cam adjusts the adjustment arm between the charge position and the transport position.

11. The system of claim 7 further comprising:
a data contact secured to the transport arm, wherein the data contact transfers data between a server and the electronic device, wherein the data contact contacts the electronic device when the adjustment arm is adjusted to the charge position, wherein the data contact does not contact the electronic device when the adjustment arm is adjusted to the transport position.

12. A charging system for storing and charging an electronic device, wherein the system releases the electronic device to an authenticated user, the system comprising:
a housing that accepts insertion of the electronic device, wherein the housing limits access to the electronic device;
a charging device within the housing that charges the electronic device;
a conveyor system upon which the electronic device is placed, the conveyor system defining a vertical axis, wherein the conveyor system conveys the electronic device vertically through the housing, wherein the charging device charges the electronic device while the electronic device is on the conveyor system, wherein the conveyor system releases the electronic device vertically downward at a lower end of the conveyor system;
a release aperture of the housing located vertically below the lower end of the conveyor system, wherein the conveyor system conveys the electronic device toward the release aperture; and
a ramp located within the housing, wherein the conveyor system releases the electronic device vertically downward to the ramp, wherein the ramp directs the electronic device to the release aperture of the housing.

13. The system of claim 12 wherein the conveyor system comprises:
a first screw conveyor located on a first side of the electronic device;
a second screw conveyor located on a second side of the electronic device, wherein the first side is located opposite the second side;
a third screw conveyor located on the first side of the electronic device; and
a fourth screw conveyor located on the second side of the electronic device.

14. The system of claim 12, wherein the conveyor system comprises:
a first belt conveyor located on a first side of the electronic device;
a second belt conveyor located on a second side of the electronic device;
a transport finger on each belt conveyor wherein the electronic device is positioned on the transport fingers of the first belt conveyor and the second belt conveyor.

15. The system of claim 12 further comprising:
a charging contact of the charging device, wherein the charging contact contacts the electronic device to charge the electronic device;
wherein the conveyor system conveys the electronic device vertically downward to the charging device.

16. The system of claim 15 further comprising:
an adjustment arm attached to the housing wherein the charging contact is located on the adjustment arm;
wherein the adjustment arm adjusts between a charge position to charge the electronic device and a transport position in which the charging contact does not contact the electronic device;
wherein the charging contact contacts the electronic device to charge the electronic device when the adjustment arm is adjusted to the charge position.

17. The system of claim 16, wherein the adjustment arm is pivotally attached to the housing to pivot towards the electronic device when adjusted to the charge position and the adjustment arm pivots away from the electronic device when adjusted to the transport position.

18. A charging system for storing and charging an electronic device, wherein the system releases the electronic device to an authenticated user, the system comprising:
- a housing that accepts insertion of the electronic device wherein the housing limits access to the electronic device;
- a charging device within the housing that charges the electronic device;
- a conveyor system that conveys the electronic device to the charging device;
- a release aperture of the housing, wherein the electronic device is removed from the release aperture;
- a first charging contact of the charging device, wherein the charging contact contacts the electronic device to charge the electronic device;
- an adjustment arm attached to the housing wherein the charging contact is located on the adjustment arm;
- wherein the adjustment arm adjusts between a charge position to charge the electronic device and a transport position in which the charging contact does not contact the electronic device;
- wherein the charging contact contacts the electronic device to charge the electronic device when the adjustment arm is adjusted to the charge position.

19. The system of claim 18, wherein the adjustment arm is pivotally attached to the housing to pivot towards the electronic device when adjusted to the charge position and the adjustment arm pivots away from the electronic device when adjusted to the transport position.

20. The system of claim 19 wherein the charging contact is spring loaded so that the charging contact at least partially withdraws into the adjustment arm when the adjustment arm is adjusted to the charge position and the charging contact abuts the electronic device.

* * * * *